United States Patent
Roberts et al.

(10) Patent No.: US 7,701,842 B2
(45) Date of Patent: Apr. 20, 2010

(54) LOW CONVERSION RATE DIGITAL DISPERSION COMPENSATION

(75) Inventors: Kim B. Roberts, Nepean (CA); Kuang Tsan Wu, Kanata (CA); Maurice O'Sullivan, Ottawa (CA); Han Sun, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 235 days.

(21) Appl. No.: 12/030,242

(22) Filed: Feb. 13, 2008

(65) Prior Publication Data

US 2009/0201796 A1 Aug. 13, 2009

(51) Int. Cl.
*H04J 11/00* (2006.01)

(52) U.S. Cl. .................. 370/210; 398/147; 398/159; 398/158; 398/135; 398/198; 398/193; 398/202

(58) Field of Classification Search .................. None
See application file for complete search history.

(56) References Cited

U.S. PATENT DOCUMENTS

| | | | | |
|---|---|---|---|---|
| 5,781,076 | A * | 7/1998 | Iwamatsu et al. | 332/103 |
| 6,031,879 | A * | 2/2000 | Pace et al. | 375/316 |
| 7,209,664 | B1 * | 4/2007 | McNicol et al. | 398/135 |
| 7,266,306 | B1 * | 9/2007 | Harley et al. | 398/182 |
| 7,321,734 | B2 * | 1/2008 | Roberts et al. | 398/193 |
| 7,382,984 | B2 * | 6/2008 | McNicol et al. | 398/147 |
| 7,418,212 | B1 * | 8/2008 | Bontu | 398/202 |
| 7,555,227 | B2 * | 6/2009 | Bontu et al. | 398/202 |
| 2004/0067064 | A1 * | 4/2004 | McNicol et al. | 398/158 |
| 2006/0024069 | A1 * | 2/2006 | Roberts et al. | 398/198 |
| 2006/0078336 | A1 * | 4/2006 | McNicol et al. | 398/147 |
| 2007/0092259 | A1 * | 4/2007 | Bontu et al. | 398/147 |

FOREIGN PATENT DOCUMENTS

| | | |
|---|---|---|
| EP | 1040587 | 10/2000 |
| WO | 2004-032385 | 4/2004 |

OTHER PUBLICATIONS

International Search Report issued May 29, 2009 on Applicant's corresponding International Application No. PCT/CA2009/00160.
Anonymous, "Filter Basics: anti-aliasing", Maxim Integrated Products, Jan. 11, 2002, Web Document retrieved from <http://pdfserv.maxim-ic.com/en/an/AN928.pdf> on Apr. 2, 2009.

* cited by examiner

*Primary Examiner*—Chi H Pham
*Assistant Examiner*—Kouroush Mohebbi
(74) *Attorney, Agent, or Firm*—Kent Daniels; Blake, Cassels & Graydon LLP

(57) ABSTRACT

A method of suppressing effects of aliasing in a system for digitally processing a high speed signal having a symbol rate of 1/T. The high speed signal is sampled at a fractional multiple (N) of the symbol rate, wherein 1<N<2, to generate a corresponding sample stream, and filtered using a low-pass filter characteristic having a cut-off frequency corresponding to 1/2T. Phase distortions due to the filtering are compensated by digitally processing the sample stream.

19 Claims, 15 Drawing Sheets

LOW CONVERSION RATE DIGITAL DISPERSION COMPENSATION

CROSS-REFERENCE TO RELATED APPLICATIONS

This is the first application filed in respect of the present invention.

TECHNICAL FIELD

The present invention relates to high-speed optical communications networks, and in particular to a signal equalizer in a coherent optical receiver.

BACKGROUND OF THE INVENTION

Optical signals received through conventional optical links are typically distorted by significant amounts of chromatic dispersion (CD) and polarization dependent impairments such as Polarization Mode Dispersion (PMD), polarization angle changes and polarization dependent loss (PDL). Chromatic dispersion (CD) on the order of 30,000 ps/nm, and polarization rotation transients at rates of $10^5$ Hz are commonly encountered. Various methods and systems intended to address some of these limitations are known in the art.

Applicant's U.S. Pat. No. 7,023,601 issued Apr. 4, 2006 and U.S. Pat. No. 7,266,306 issued Sep. 4, 2007, and Applicant's co-pending U.S. patent applications Ser. No. 10/262,944 filed Oct. 3, 2002 and Ser. No. 10/307,466 filed Dec. 2, 2002 teach methods and systems for electronically compensating chromatic dispersion and polarization effects in a transmitter. FIGS. 1 and 2 schematically illustrate representative optical transmitters capable of implementing these methods.

In the transmitters of FIGS. 1 and 2, the transmitter 2 receives an input data stream x(t), and generates a corresponding output optical signal 4 for transmission through an optical link 6 of a communications system. A receiver (not shown in FIGS. 1 and 2) at the opposite end of the link operates to detect the optical signal, and recover the data stream x(t).

As may be seen in FIG. 1a, the transmitter 2 comprises a complex driver 8 which receives an input data stream x(t) and outputs analog drive signals $V_A(t)$ and $V_B(t)$ 10, which are supplied to respective branches of a complex optical modulator 12. The complex optical modulator 12 operates to modulate a continuous wave (CW) optical carrier signal 14 in accordance with the analog drive signals $V_A(t)$ and $V_B(t)$, to generate the output optical signal 4, which may be a carrier-suppressed optical signal. For simplicity of description, the digital input signal x(t) is considered to be a serial bit stream, but an encoded symbol stream (such as Phase Shift Keying, PSK, and Quadrature Phase Shift Keying, QPSK, symbols) may also be processed using these same techniques.

In the transmitter of FIG. 1a, the complex driver 8 comprises a digital filter 16, which implements a mapping function to generate respective multi-bit In-phase and quadrature values I(n) and Q(n) of a desired envelope of the optical E-field of the optical signal 4. Preferably, the mapping function also implements a compensation operator C[ ] to electrically pre-compensate impairments of the optical link 6, such as dispersion and polarization effects. This functionality is described in detail in applicant's co-pending U.S. patent applications Ser. No. 10/262,944 filed Oct. 3, 2002; Ser. No. 10/307,466 filed Dec. 2, 2002; Ser. No. 10/405,236 filed Apr. 3, 2003, and International Patent Application No. PCT/CA03/01044 filed Jul. 11, 2003.

Various known digital filter types may be used to implement the digital filter 16, such as, for example, a Random Access Memory Look-up Table (RAM LUT). Alternatively, the digital filter 16 may be implemented using Finite Impulse Response (FIR) filters, Infinite Impulse Response (IIR) filters, and Fast Fourier Transform (FFT filters). In either case, the digital filter 16 generates the multi-bit In-phase and quadrature signal component values I(n) and Q(n) at a sample rate which is about double the baud-rate of the input signal x(t). Thus, for example, for a baud rate of 10 Gbaud, the sample rate will be about 20 GHz.

FIG. 1b illustrates an embodiment of the digital filter 16 known from Applicant's co-pending U.S. patent application Ser. No. 10/262,944 filed Oct. 3, 2002. In this embodiment, the input data stream x(t) is supplied to a deserializer 18 (such as a shift register) which converts the serial data stream into an n-bit parallel input vector, which is input to a Random Access Memory Look-Up Table (RAM LUT) 20. The RAM LUT 20 is pre-loaded with values of I(n) and Q(n) which are computed in advance for each possible value of the input vector, based on the compensation operator C[ ]. The width of the deserializer 18 (and thus also the input vector and the RAM LUT 20) is determined based on the maximum anticipated dispersion of the link 6. In some embodiments, this width may be 64 or 128 bits. For higher speed systems, it may be desirable to extend the width beyond 128 bits, for example to 512 bits or 1024 bits, so as to enable compensation of large amounts of dispersion (e.g. 30000 ps/nm or more) at line rates exceeding 10 GBaud. If desired, the RAM LUT 20 may be divided into blocks (not shown) spanning a portion of the width of the input vector, and the respective outputs of each of the blocks combined to obtain the final values of I(n) and Q(n). With the embodiment of FIG. 1b, obtaining a sample rate $1/T_s$ at the output of the RAM LUT 20 that is double the baud rate of the input data stream x(t), can be obtained by computing, for each possible value of the input vector, a pair of I(n) and Q(n) values. A first I(n), Q(n) value is computed for the input vector with a phase shift of zero, while the second I(n), Q(n) value is computed for the input vector with a phase shift of T/2, where T is the bit- or symbol-period of the input data stream x(t). With this arrangement, the first and second I(n), Q(n) values can be latched out of the RAM LUT 20 during each bit-period T of the input data stream x(t).

A non-linear compensator 22 (which may also be implemented as a RAM LUT) is used to adjust the value of each successive sample I(n) and Q(n), to compensate non-linear performance of the transmitter 2, as described in Applicant's co-pending U.S. patent application Ser. No. 10/262,944, filed Oct. 3, 2002; and International Patent Application No. PCT/CA03/01044 filed Jul. 11, 2003. The non-linear compensator 22 may be implemented as a separate device cascaded with the digital filter 16, as shown in FIG. 1, or may be "embedded" within the digital filter 16 by applying the mapping function implemented by the non-linear compensator 22 to the digital filter 16.

Respective high-speed Digital-to-Analog Converters (DACs) 24a,24b are used to convert the multi-bit sample values $V_I(n)$ and $V_Q(n)$ output from the non-linear compensator 22 into corresponding analog signals $V_A(t)$ and $V_B(t)$. If desired, the analog signals $V_A(t)$ and $V_B(t)$ can be conditioned, for example by means of respective filters 26a,26b and low noise amplifiers (LNA) 28a,28b, in a conventional manner, to remove out-of-band noise and to scale the signal amplitude to the dynamic range of the complex modulator 12.

As may be appreciated, the effects of the independent DACs 24a,24b, the filters 26a,26b and the LNAs 28a,28b for each signal may cause differential propagation delays between the non-linear compensator 22 and the optical modulator 12. Such differential delay can be compensated by means of digital filters 30a,30b located in at least one of the signal paths. Each digital filter 30a,30b can be controlled in a known manner to impose a selected delay, which is calculated to compensate for the differential propagation delays experienced by each of the signal components.

Referring now to FIG. 2, there is shown an embodiment of a system 32 which generates a polarization multiplexed optical signal 4', in which respective different data streams $x_A(t)$ and $x_B(t)$ are modulated onto respective orthogonal transmitted polarizations 34 of the optical signal 4'. The system of FIG. 2 generally incorporates a pair of parallel transmitters 2 of the type shown in FIGS. 1a and 1b. In this case, each transmitter 2 receives a respective input signal $x_A(t)$ and $x_B(t)$, which may be independent data streams or may be derived from a single data stream. A common narrow band laser may be used for both complex modulators 12, as shown in FIG. 2, although separate lasers may also be used if desired. In either case, both complex modulators 12 operate at the same CW signal wavelength, and orthogonal polarizations.

The polarization multiplexed communications signal 4' is generated by combining the respective optical signals 34a, 34b from each transmitter 2, using a polarization combiner 36. Respective polarization rotators 38a, 38b ensure orthogonal polarization states of the two optical signals 34a, 34b. This ensures that the two optical signals 34a, 34b are fully orthogonal, and thus can be combined into the polarization-multiplexed communications signal 4' without interference.

Applicant's co-pending U.S. patent applications Ser. No. 11/294,613 filed Dec. 6, 2005 and entitled "Polarization Compensation In A Coherent Optical Receiver"; Ser. No. 11/366,392 filed Mar. 2, 2006 and entitled "Carrier Recovery In A Coherent Optical Receiver"; and Ser. No. 11/423,822 filed Jun. 13, 2006 and entitled "Signal Acquisition In A Coherent Optical Receiver", the content of all of which are hereby incorporated herein by reference, teach methods and systems for electronically compensating chromatic dispersion and polarization effects in a receiver. FIG. 3 schematically illustrates a representative coherent optical receiver capable of implementing these methods.

As may be seen in FIG. 3, an inbound optical signal 4" is received through the optical link 6, split into orthogonal received polarizations X,Y by a Polarization Beam Splitter 40, and then mixed with a Local Oscillator (LO) signal 42 by a conventional 90° optical hybrid 44. The composite optical signals emerging from the optical hybrid 44 are supplied to respective photodetectors 46, which generate corresponding analog electrical signals. The photodetector signals are sampled by respective Analog-to-Digital (A/D) converters 48 to yield raw multi-bit digital signals $I_X$, $Q_X$ and $I_Y$, $Q_Y$ corresponding to In-phase (I) and Quadrature (Q) components of each of the received polarizations.

Preferably, the raw multi-bit digital signals have resolution of n=5 or 6 bits which has been found to provide satisfactory performance at an acceptable cost. In the above-noted U.S. patent applications, the sample rate of the A/D converters 48 is selected to satisfy the Nyquist criterion for the highest anticipated symbol rate of the received optical signal. Thus, for example, in the case of an optical network link 6 having a line rate of 10 GBaud, the sample rate of the A/D converters 48 will be approximately 20 GHz.

From the A/D converters 48, the respective n-bit signals $I_X$, $Q_X$ and $I_Y$, $Q_Y$ of each received polarization are supplied to a respective dispersion compensator 50, which operates on the raw digital signals to at least partially compensate chromatic dispersion of the received optical signal. The dispersion compensators 50 may be configured to operate as described in Applicant's co-pending U.S. patent application Ser. No. 11/550,042 filed Oct. 17, 2006.

The dispersion-compensated digital signals 52 appearing at the output of the dispersion compensators 14 are then supplied to a polarization compensator 54 which operates to compensate polarization effects, and thereby de-convolve transmitted symbols from the complex signals 52 output from the dispersion compensators 50. If desired, the polarization compensator 54 may operate as described in Applicant's co-pending U.S. patent application Ser. No. 11/294,613 filed Dec. 6, 2005 and Ser. No. 11/366,392 filed Mar. 2, 2006. The output of the polarization compensator 54 is a pair of multi-bit estimates X'(n) and Y'(n), 56 of the symbols encoded on each transmitted polarization 34 (FIG. 2). The symbol estimates X'(n), Y'(n) appearing at the output of the polarization compensator 54 are then supplied to a carrier recovery block 58 for LO frequency control, symbol detection and data recovery, such as described in Applicant's co-pending U.S. patent application Ser. No. 11/366,392 filed Mar. 2, 2006.

In the above described system, the dispersion compensators 50 operate across a large number of successive samples (e.g. 128 samples), which permits compensation of relatively severe chromatic dispersion, but at a cost of a relatively slow response to changing dispersion. This slow response is acceptable, because of the known slow rate of change of dispersion in real-world optical links. The polarization compensator 54, in contrast, is comparatively very narrow (e.g. on the order of about 5 samples), to enable a rapid update frequency, which is necessary to track observed high-speed polarization transients.

The above-described systems provide reliable signal acquisition, compensation of dispersion and polarization effects, carrier recovery and data recovery even in the presence of moderate-to-severe optical impairments. This, in turn, enables the deployment of a coherent optical receiver in real-world optical networks, with highly attractive signal reach and line rate characteristics. For example, a transmitter implementing the techniques described above with reference to FIG. 1 has demonstrated a signal reach of over 3000 km at a line rate of 10 GBaud, while a receiver implementing the methods described above with reference to FIG. 3 has demonstrated equivalent performance. It is noteworthy that this performance has been measured with real-time continuous processing, not just burst data acquisition followed by off-line processing or simulation. The receiver system described above with reference to FIG. 3 is the only coherent optical receiver known to the applicants to have achieved such real-time performance at multiple gigabaud.

A critical part of the design of an electronic dispersion compensation system, such as those described above with reference to FIGS. 1-3, is the sampling rate of the Digital-to-Analog converter (DAC) 24 in the transmitter and/or the Analog-to-Digital (A/D) converter 48 in the receiver. It is standard practice to sample at an integer multiple (N) of the symbol rate. When N=1, the samples need to be aligned at the center of the eye in order that the signal can be accurately decoded. Because the signal bandwidth is greater than half of the sampling rate there will be a large amount of aliasing with N=1, precluding the application of frequency dependent digital filtering operations such as compensation for chromatic dispersion or Polarization Mode Dispersion (PMD).

Using the example of chromatic dispersion, the amount of phase shift that is caused by dispersion is proportional to the square of the frequency, and so is the phase shift of the compensation function. When some energy is aliased to appear at a frequency that is not the actual optical transmission frequency, then the wrong amount of dispersion compensation is applied to that energy. This energy then corrupts the eye of the received signal.

When these frequency dependent filtering operations are desired it is standard practice to sample at N≧2, so as to avoid aliasing. Thus, for example, in the case of an optical network link having a symbol rate of 10 GBaud, when N=2 the sample rate of the DAC and/or A/D converters will be approximately 20 GHz.

More particularly, consider a system in which a baseband optical signal having a line (or symbol) rate of 1/T=10 Gbaud and a Bessel approximation to the ideal raised cosine spectrum (α=1.0), is sampled at a sample rate of 1/Ts=10 GHz (that is, N=Ts/T=1). This scenario, in which the sample period Ts=T, may be referred to as T-spaced sampling. Each sample of the sample stream is an impulse, so the frequency-domain spectrum of the sample stream will span a frequency range of 0-10 GHz, which encompasses the upper side-band of the optical signal, as may be seen in FIG. 4a. In this drawing, the lower side-band, spanning the frequency range between 0 and −10 GHz, is shown in dotted line. In fact, duplicates of the entire spectrum will repeat at 1/Ts=10 GHz intervals to infinity, as shown by the dashed lines, in FIG. 4b. As a result, the frequency-domain spectrum of the sample stream, between 0-10 Ghz will contain both the upper side-band of the baseband signal, and the lower side-band of the first order harmonic. The overlap between the baseband spectrum (centered at 0) and the first order harmonics (centered at ±10 GHz) represents aliasing. The use of a low-pass filter, as shown in FIG. 4c, to suppress frequencies above the base band reduces the aliasing (shaded regions of FIG. 4b), but not enough to prevent severe signal distortions. In this respect, it should be noted that in order to avoid severe effects upon the eye from phase distortion, the low pass filter normally used for this operation is an analog filter having a fifth order Bessel filter response, or an approximation to that shape. On the other hand, doubling the sample rate to 1/Ts=20 GHz (that is, T/2 or Nyquist sampling) causes the duplicate spectra to repeat at 1/Ts=20 GHz intervals. As may be seen in FIG. 4d, T/2 sampling eliminates the overlap between the baseband and $1^{st}$ harmonic spectra, and thus distortions due to aliasing.

Professor Joseph Kahn of Stanford University stated at the IEEE LEOS Summer Topical Workshop in Portland Oreg. July 2007, that N could be as small as ⅔, and that N needed to be an integer multiple of ½ in order for the digital signal processing to be feasible. However, operation at N=³⁄₂ would require an analog low pass filter with a very steep roll-off to suppress aliasing. For the purposes of the present disclosure, a "steep" (or, equivalently, a "sharp") roll-off is considered to be a roll-off of greater than 20 dB per decade, for example 80 dB per decade. The desirable corner frequency is generally ½T, but can vary from that value with other design considerations and component tolerances. FIG. 5a illustrates the filter characteristic of a Chebychev filter having a suitable roll-off and a corner frequency of 17.5 GHz. As may be seen in FIG. 5b, such a filter inherently exhibits a highly non-linear group delay characteristic, as a function of frequency. This non-linear group delay characteristic causes unacceptable phase distortions to the received eye.

With increasing demand for link band-width, it would be desirable to increase the line rate beyond 1/T=10 Gbaud. For example, lines rates of 35 GBaud and higher have been proposed. However, as the line rate is increased, the sample rate 1/T$_s$ of the digital circuits within the transmitter and receiver must also increase, in order to maintain the T/2 sampling needed to avoid aliasing.

It will be appreciated that increased sample rates imply that the power consumption of the receiver must necessarily also increase, as will the heat generated by the circuits during run-time. This can impose an effective "thermal barrier" to increasing the line rate, as higher temperatures degrade system reliability. In addition, higher sampling rates are more difficult to implement in any practical integrated circuit (such as an Application Specific Integrated Circuit, ASIC, or a Field Programmable Gate Array, FPGA) due to sampling time jitter and limited bandwidth of the available circuit components.

Accordingly, techniques that enable reliable operation of digital signal processing systems at line rates above 10 Gbaud are highly desirable.

SUMMARY OF THE INVENTION

The present invention addresses the above-noted problems by providing a technique for processing digital signals that enables the optical signal to be sampled at a sample rate less than that required to satisfy the Nyquist criterion.

Thus, an aspect of the present invention provides a method of suppressing effects of aliasing in a system for digitally processing a high speed signal having a symbol rate of 1/T. The high speed signal is sampled at a fractional multiple (N) of the symbol rate, wherein N<2, to generate a corresponding sample stream, and filtered using a low-pass filter characteristic having a cut-off frequency corresponding to ½T. Phase distortions due to the filtering are compensated by digitally processing the sample stream.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides technique for transmitting digital signals through a high-speed optical network, in which sample rates significantly below T/2 can be used. Embodiments of the present invention are described below, by way of example only, with reference to FIGS. 6-14.

In very general terms, the present invention provides methods and systems, in which aliasing is mitigated by oversampling the received optical signal, at a fractional multiple N of the symbol rate, wherein N<2, which corresponds to a sample period $T_s$ of $T_s$>T/2. Fractional sampling avoids the thermal barrier associated with the extreme sample rates implied by full T/2 sampling, and yet shifts the $1^{st}$ harmonic spectra away from the baseband signal. This shifting of the $1^{st}$ harmonic spectra reduces overlap at the tails. High order analog low pass filtering of the optical signal (either in the optical or electrical domain) with a very steep roll-off and a cut-off frequency corresponding to ½T can be implemented in the receiver to suppress the aliasing terms. The otherwise crippling phase distortions generated by this analog filtering can be characterized mathematically, and so can be compensated digitally.

Figure 6B:
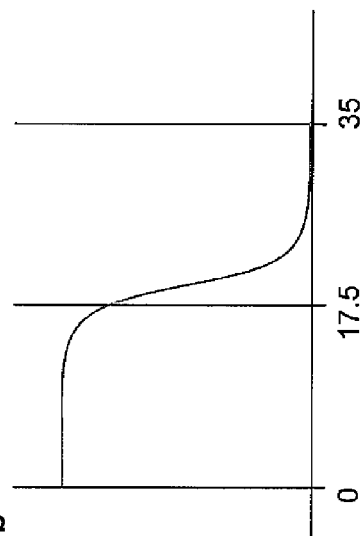
FIGS. 6a-6c illustrate a method or reducing aliasing in accordance with an aspect of the present invention.
Figure 6A:
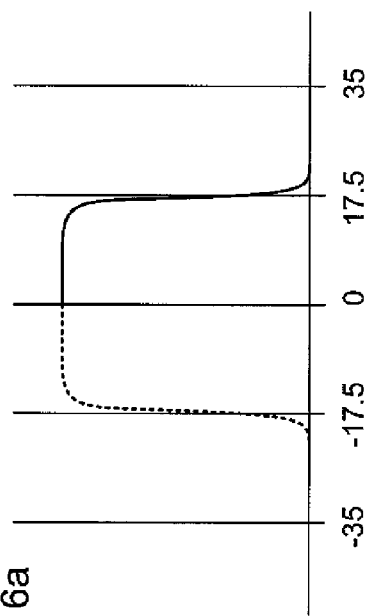
Figure 6C:
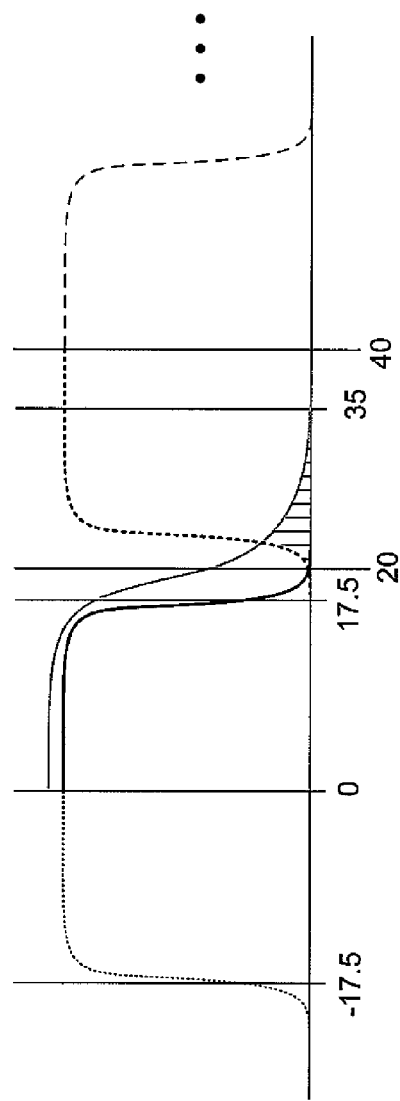

For example, consider a 35 GBaud optical signal generated with a "squared" spectrum (i.e. raised cosine, $\alpha$=0.1), which exhibits a sharp roll-off at 17.5 GHz and suppressed signal energy beyond these frequencies, as illustrated in FIG. 6a. Transmitters of the type known from Applicant's U.S. Pat. No. 7,023,601 issued Apr. 4, 2006 and U.S. Pat. No. 7,266,306 issued Sep. 4, 2007, for example, are readily capable of generating an optical signal having the desired squared spectrum. Oversampling the optical signal at the receiver using 7T/8 sampling (that is, N=Ts/T=8/7) corresponds to a sample rate of $1/T_s$=8/7×35 GHz=40 GHz, so that the $1^{st}$ harmonic spectra will be centered at 40 GHz. As may be seen in FIG. 6c, this creates a margin of about 5 GHz width between the baseband and $1^{st}$ harmonic spectra, which significantly reduces the overlap between these spectra. Low-pass filtering in the receiver, for example using a conventional Chebychev or Butterworth-8 filter characteristic with a sharp roll-off and a cut-off frequency of ½T=17.5 GHz, as shown n FIG. 6b effectively suppresses energy of the $1^{st}$ harmonic between 20 and 40 GHz. The residual aliasing terms, shown by the shaded region of FIG. 6c, are low enough that the resulting errored bits can be successfully corrected by conventional Forward Error Correction (FEC) processing techniques.

The description below presents, by way of example only, three alternative embodiments in which link impairments are compensated at fractional sample rates, in accordance with the present invention, as follows: a time-domain implementation in the transmitter; a frequency-domain implementation in the transmitter, and a frequency-domain implementation in the receiver.

Transmitter: Time Domain

Figure 1A:
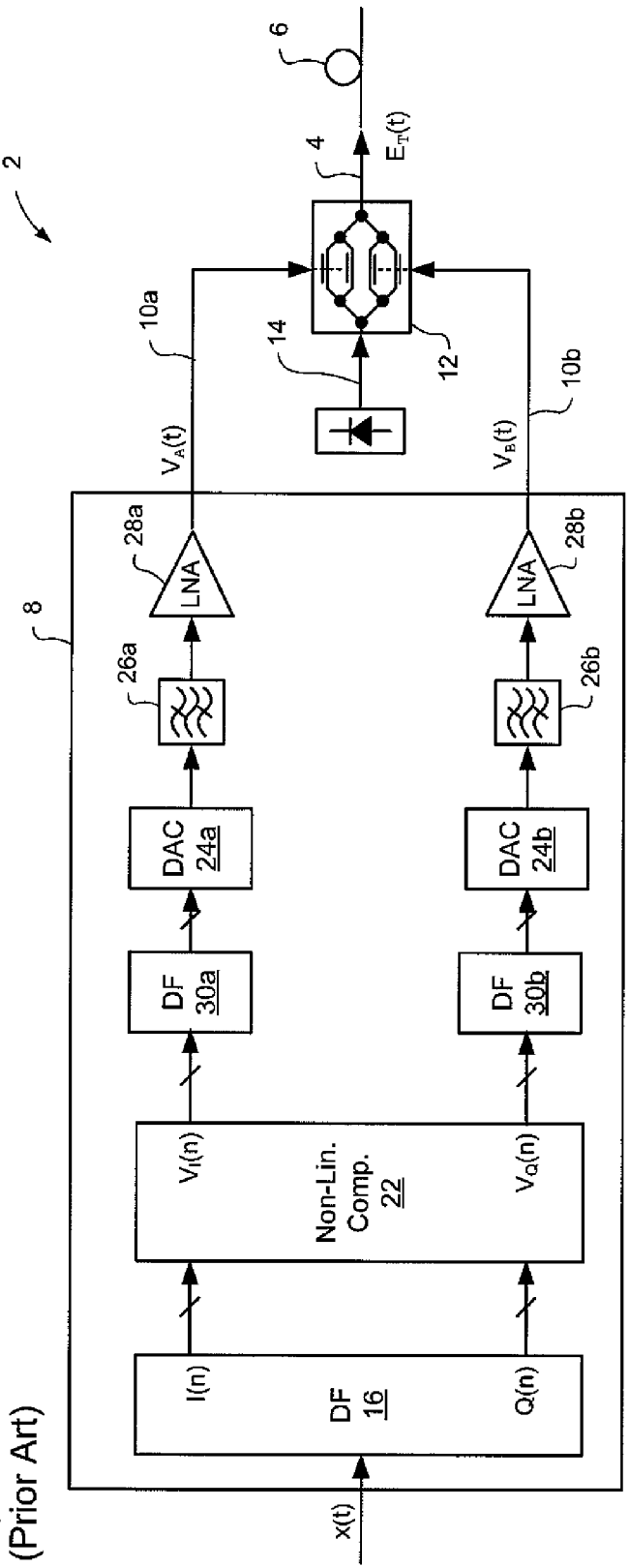
FIGS. 1a and 1b are block diagrams schematically illustrating principal elements and operations of a transmitter known from Applicant's U.S. Pat. No. 7,023,601 issued Apr. 4, 2006 and U.S. Pat. No. 7,266,306 issued Sep. 4, 2007, and Applicant's co-pending U.S. patent applications Ser. No. 10/262,944 filed Oct. 3, 2002 and Ser. No. 10/307,466 filed Dec. 2, 2002.
Figure 1B:
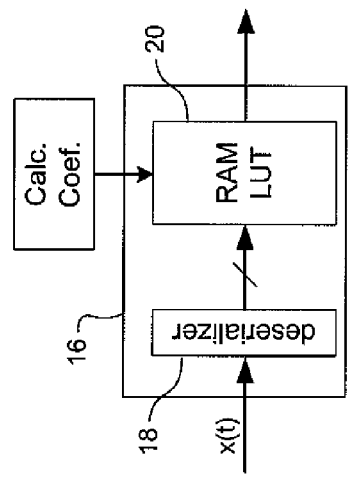

As discussed above with reference to FIGS. 1a and 1b, the digital filter 16 described in Applicant's co-pending U.S. patent applications Ser. Nos. 10/262,944 and 10/307,466 compensates link impairments (in accordance with the compensation operator C[ ]), and generates I(n) and Q(n) sample streams at a sample rate of double the baud rate of the input data stream x(t). Since both of these operations are performed in the time domain, it will be seen that the transmitters of FIGS. 1 and 2 implement time-domain compensation with T/2-sampling. In the present embodiment, this performance is extended to provide time-domain compensation with fractional sampling.

Figure 2:
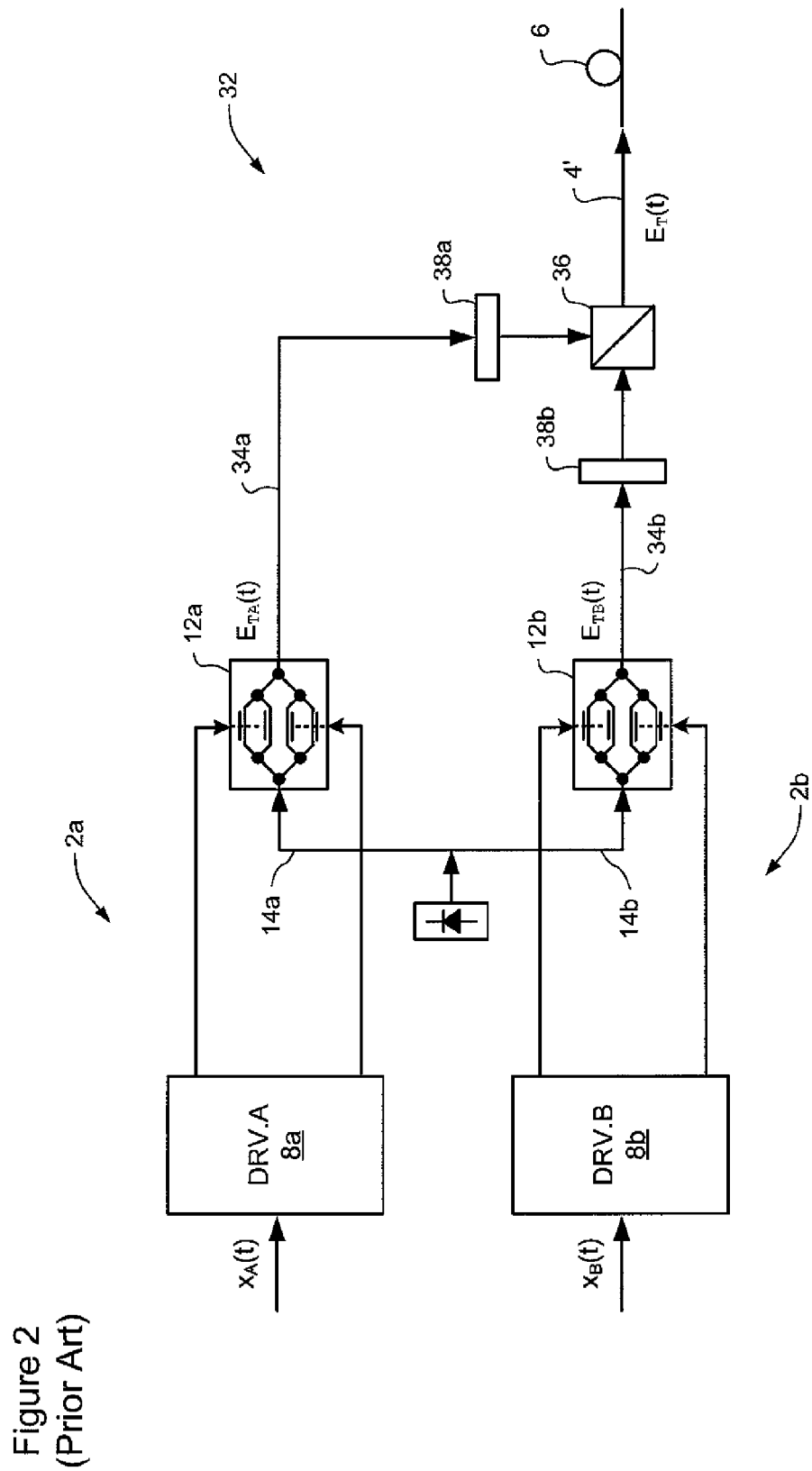
FIG. 2 is a block diagram schematically illustrating principal elements and operations of a second transmitter known from Applicant's U.S. Pat. No. 7,023,601 issued Apr. 4, 2006 and U.S. Pat. No. 7,266,306 issued Sep. 4, 2007.
Figure 7:
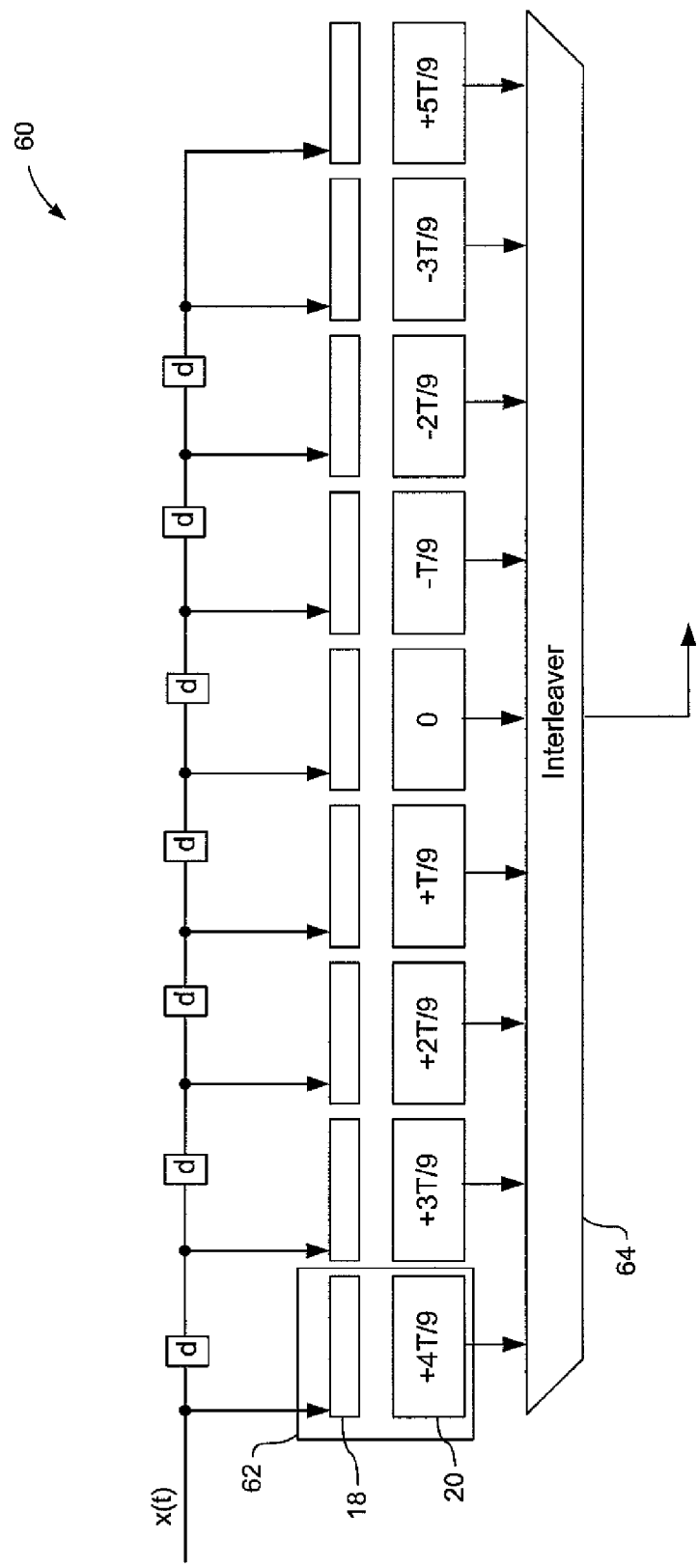
FIG. 7 is a block diagram illustrating operation of a digital filter usable in the transmitter of FIG. 1, and implementing a time-domain tractional sampling technique in accordance with an aspect of the present invention.

FIG. 7 conceptually illustrates operation of a digital filter 60 usable in the transmitter of FIGS. 1 and 2, in place of the digital filter 16, to provide time-domain impairment compensation with 8T/9-sampling (i.e. N=9/8). Thus for example, if the input data stream x(t) has a baud rate of 35 GBaud, the sample rate of the I(n),Q(n) sample streams output from the digital filter will be 39.38 GHz. The remaining elements of the transmitter of FIGS. 1 and 2 can remain largely unchanged, except as may be necessary to accommodate the different sample rate.

In the embodiment of FIG. 7, the digital filter 60 comprises a set of nine parallel filter blocks 62, each of which comprises a deserializer 18 and RAM LUT 20 as described above with reference to FIG. 1b. Each filter block 62 receives the input data stream x(t) with the delays indicated below in table 1, and outputs a respective I(n),Q(n) sample in a period of 8T. The respective RAM LUT 20 of each filter is loaded with values of I(n) and Q(n) computed for each possible value of the input vector, at the phase shift indicated below in table 1 and shown in FIG. 7.

| Filter Block | Delay | Phase Shift |
| --- | --- | --- |
| 0 | 0 | +4T/9 |
| 1 | T | +3T/9 |
| 2 | 2T | +2T/9 |
| 3 | 3T | +T/9 |
| 4 | 4T | 0 |
| 5 | 5T | −T/9 |
| 6 | 6T | −2T/9 |
| 7 | 7T | −3T/9 |
| 8 | 7T | +5T/9 |

In operation, during each clock cycle (of period 8T), 8 bits of the input data stream x(t) are latched into the respective deserializer 18 of each filter block 62, with the appropriate delays. The resulting input vectors are then applied to each RAM LUT 20, to yield nine I(n),Q(n) sample values, which can then be interleaved (at 64) in the correct order and latched out of the digital filter 60. The combined effect of the delays imposed on the input data stream x(t) and the phase shifts applied during calculation of the I(n),Q(n) values loaded into each RAM LUT 20, is the generation of nine, T/N=8T/9-spaced I(n),Q(n) sample values during each clock cycle, which is the desired result.

The approach described above with reference to FIG. 7 is valid because the actual desired envelope of the optical E-field of the output optical signal 4 is a continuous analog function. Each successive input vector supplied to the RAM LUT 20 is an impulse which, via the compensation operator C[ ], maps to an instantaneous value the desired optical E-field. However, for any given input vector, the contour of the E-field envelope can be fully defined from the compensation operator C[ ]. Since the analog contour of the E-Field envelope is known, it is possible to compute instantaneous values of the desired E-field at any desired phase relative the input vector, to obtain the values of I(n) and Q(n) which need to be loaded into the respective RAM LUT 20 of each filter block 62. It may be appreciated that, at extreme phase shift values the accuracy of the computed instantaneous optical E-field envelope value will become increasingly inaccurate, due to the finite length of the input vector. However, for the very small phase shifts described above, the accuracy of this calculation is sufficient.

It will be appreciated that the above approach can be suitably modified to obtain other values of N. In a more generic sense, N can be defined as N=n/d, in which case the above approach can be described by implementing the digital filter 60 comprising a set of n parallel filter blocks 62. During each clock cycle (of period dxT), a set of d symbols of the input data signal is latched into each filter block 62 with the appropriate delay, and the corresponding values of I(n) and Q(n) from each filter block 62 interleaved.

Similarly, it will be appreciated that other values of the phase shifts can applied during calculation of the I(n),Q(n) values loaded into each RAM LUT 20. The important characteristic is that the phase shifts and delays are cooperatively selected to ensure that, for each clock cycle (of period dxT) the n values of I(n) and Q(n) output by each filter block 62 represent instantaneous values of the desired optical E-field that are evenly spaced in time.

The filters 26 can be configured as reconstruction filters having a low-pass filter characteristic (such as, for example, a Butterworth-8 filter) having a sharp roll-off at about ±½T=17.5 GHz to suppress aliasing terms beyond about 20 GHz, as described above with reference to FIG. 6. The phase distortions introduced by these filters 28 can be characterised as a function of frequency, using well known techniques. This information can then be used to modify the compensation operator C[ ] so as to compensate the phase distortions introduced by the filters 28.

As noted above, FIG. 7 shows a conceptual illustration of a digital filter 60 implementing the Time-Domain technique. As may be appreciated, a practical digital filter could be implemented which follows this conceptual model fairly closely. However, it is anticipated that those of ordinary skill in the art will, in the light of the present teaching, be able to design various alternative implementations.

Transmitter: Frequency Domain

The Time-domain techniques described above with reference to FIG. 7 are particularly suited to transmitters in which the input data stream x(t) is a serial bit stream. While the digital filter 60 of FIG. 7 can be modified to accommodated a stream of encoded symbols (e.g. PSK or QPSK symbols), or nonlinearly equalized signals, such modifications tend to greatly increase complexity and cost of the circuitry. In most cases, frequency domain techniques offer a more efficient approach.

Figure 8:
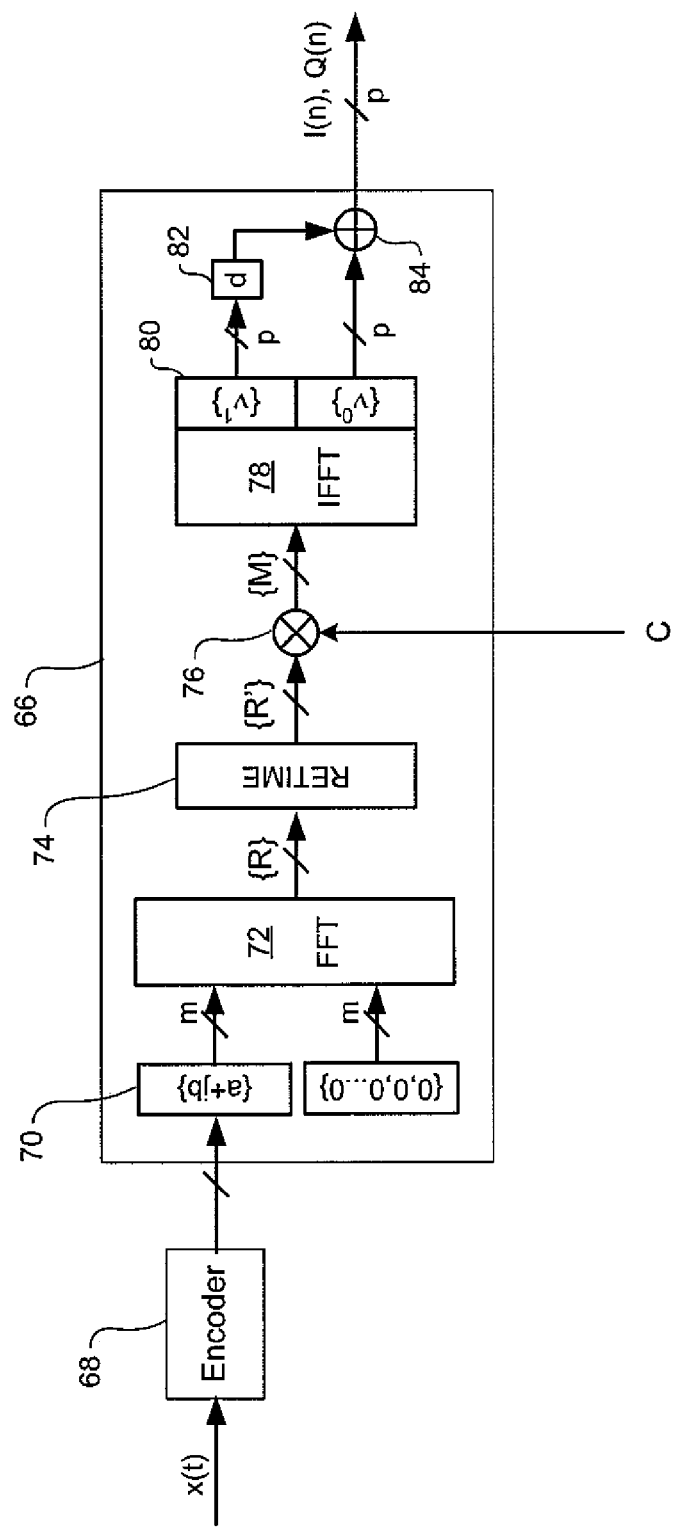
FIG. 8 is a block-diagram illustrating operation of a digital filter usable in the transmitter of FIG. 1, and implementing a frequency-domain fractional sampling technique in accordance with an aspect of the present invention.

FIG. 8 is a block diagram illustrating operation of a digital filter 66 usable in the transmitter of FIGS. 1 and 2, in place of the digital filter 16, to provide frequency-domain impairment compensation with 7T/8-sampling (i.e. N=8/7).

In the embodiment of FIG. 8, the input data signal x(t) is supplied to an encoder 68, which outputs a corresponding multi-bit complex valued symbol stream. For example the input data signal x(t) may take the form of one or more serial bit-streams, and the multi-bit complex valued symbol stream output from the encoder 68 are PSK or QPSK symbols. Other encoding techniques may be used as desired, for example Optical Orthogonal Frequency Division Multiplexing (O-OFDM). In any case, the T-spaced multi-bit symbols output from the encoder are deserialized (at 70) and the resulting m-word input vector {a+jb} latched into a fast Fourier Transform (FFT) block 72. The FFT block is a conventional complex FFT block having a width selected to compensate the maximum anticipated chromatic dispersion of the optical link. In some embodiments, the FFT block 72 may have a width of 896 taps taps, in which case m=448.

The array {R} output by the FFT block 72 is then supplied to a retiming block 74, which operates to re-time the array {R} from the T-spaced timing of the encoder 68 to the desired 7T/8 sampling of the DACs 24.

By way of example only, consider an embodiment in which a 35 GBaud symbol stream from the encoder 68 is to be processed and transmitted through the optical link 6. In order to avoid aliasing, it is desired to over-sample the symbol stream at a fractional sampling frequency of 8/7T, which corresponds with a sample rate of $1/T_s$=40 GHz. In this case, the array {R} output by the FFT block 72 spans a frequency range of 0-35 GHz. The lower half of this array (corresponding to a frequency range of 0-17.5 GHz) encompasses the upper side-band of the baseband spectrum of the encoded input signal, while the upper half of the array (corresponding to 17.5-35 GHz) encompasses the lower side band of the $1^{st}$ harmonic spectrum. In the case of an FFT block of 896 taps width, 7T/8 sampling can be accomplished by increasing the width of the spectrum to 1024 taps. The values of the added 128 taps can be determined by exploiting the fact that the upper and lower side bands are nominally mirror images of each other, so that the tap values are substantially symmetrical about the center of the array.

Figure 9:
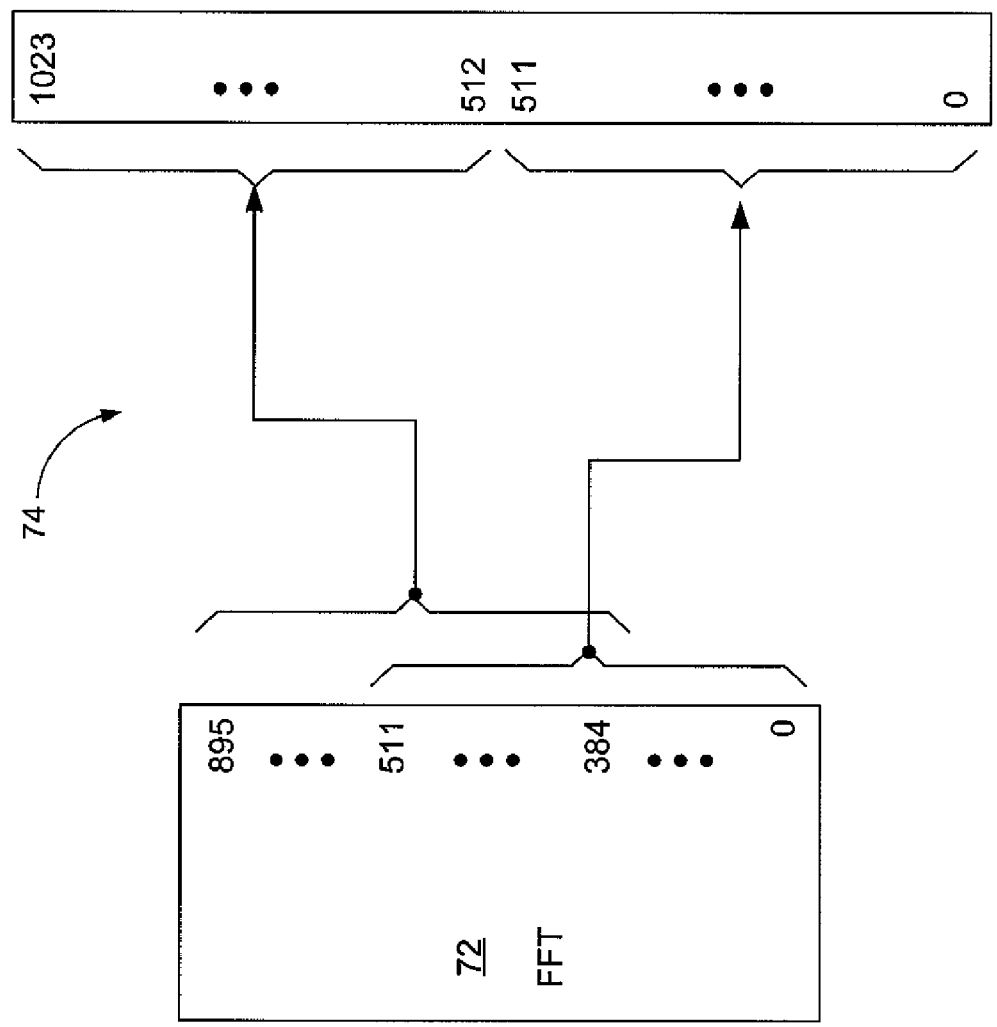
FIG. 9 is a block diagram illustrating operation of the re-timing block of FIG. 8.

Following this example, the retiming block 74 can be constructed as shown in FIG. 9. Thus, the FFT taps (0-511) are supplied to taps 0-511 of the re-timed array; and FFT taps (384-895) are supplied to taps 512-1023 of the re-timed array. This results in a retimed spectrum 1024 taps in width, as desired.

Returning to FIG. 8, the re-timed array {R'} is then supplied to a Frequency Domain multiplier 76, which applies a compensation vector {C} to yield a modified array {M}. The compensation vector {C} can be computed using a transform of a $1^{st}$ order dispersive function to at least partially compensate chromatic dispersion of the optical link 6. The phase distortions introduced by the analog filters 28 can also be characterised as a function of frequency, using well known techniques. This information can then be used to modify the compensation vector {C} so as to compensate phase distortions introduced by the analog filters 26.

The modified array {M} output from the Frequency Domain multiplier 76 is then supplied to an Inverse Fast Fourier Transform (IFFT) block 78, which operates at the 7T/8-sampling rate of 40 GHz to generate time domain data 80, in the form of a complex valued vector having a width equal to the IFFT 78, which, in the illustrated embodiment is N=1024 taps. The IFFT output data 80 is divided into two blocks {v⁰}, and {v¹}, of which {v¹_x} is delayed by one clock cycle (at 82) and added to {v⁰_x} (at 84) to yield the digital filter output in the form of a complex valued vector {I(n)+jQ(n)} representing p=512T/N=7T/8-spaced I(n),Q(n) values of the desired optical E-field envelope.

Receiver: Frequency Domain

Figure 10:
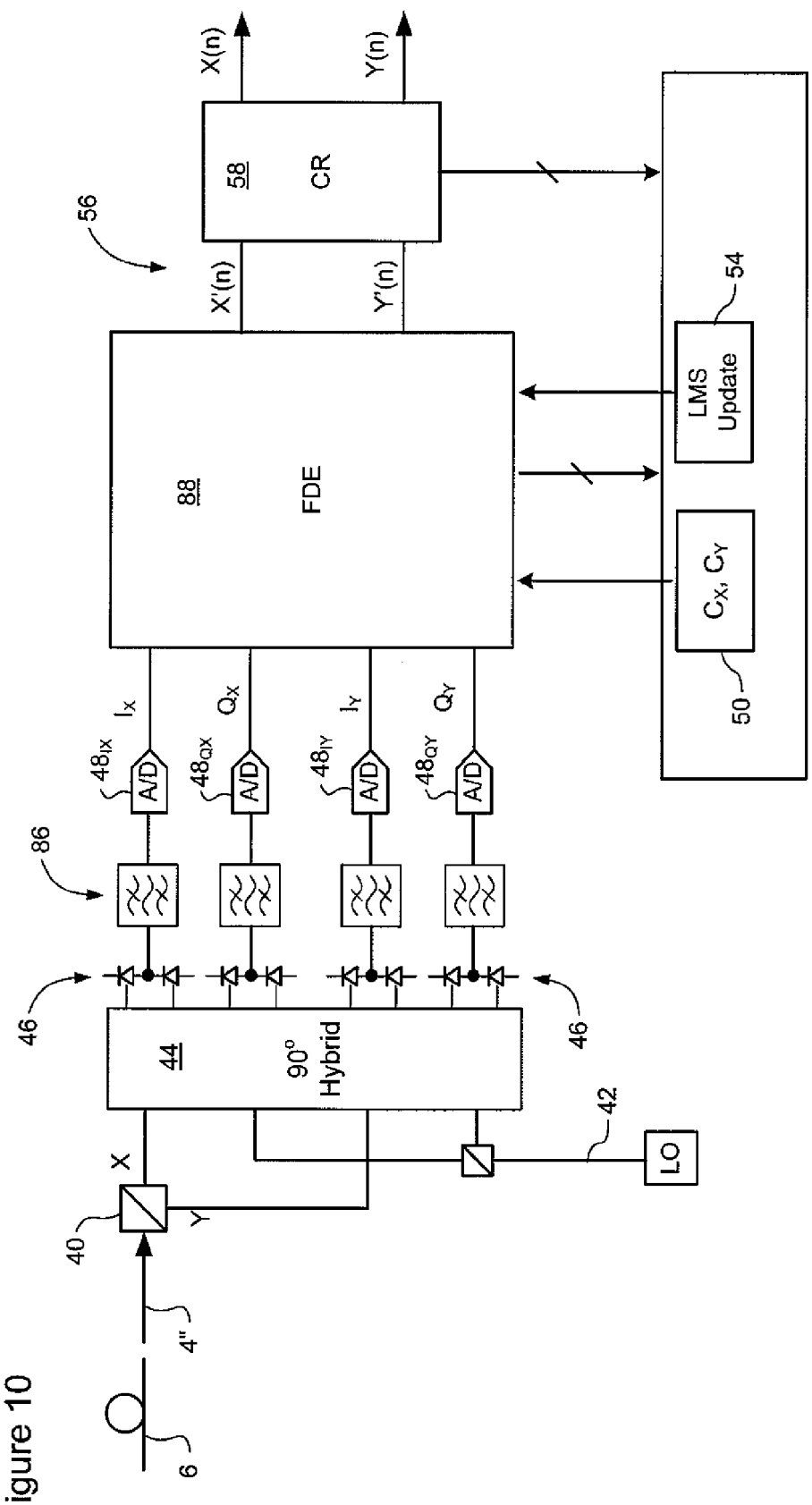
FIG. 10 is a block diagram schematically illustrating principal elements and operations of a coherent optical receiver in which methods and systems accordance with an embodiment of the present invention may be implemented.

FIG. 10 illustrates principle elements of a coherent optical receiver which utilizes fractional sampling in accordance with the present invention. The embodiment of FIG. 10 implements the required sample rate conversion in the frequency domain. In principle, sampling rate conversion can be performed accurately in the time domain within the receiver. However, this option is not described in detail herein because the complexity of the circuit implementation makes this alternative less desirable than the frequency-domain embodiment described below.

Figure 3:
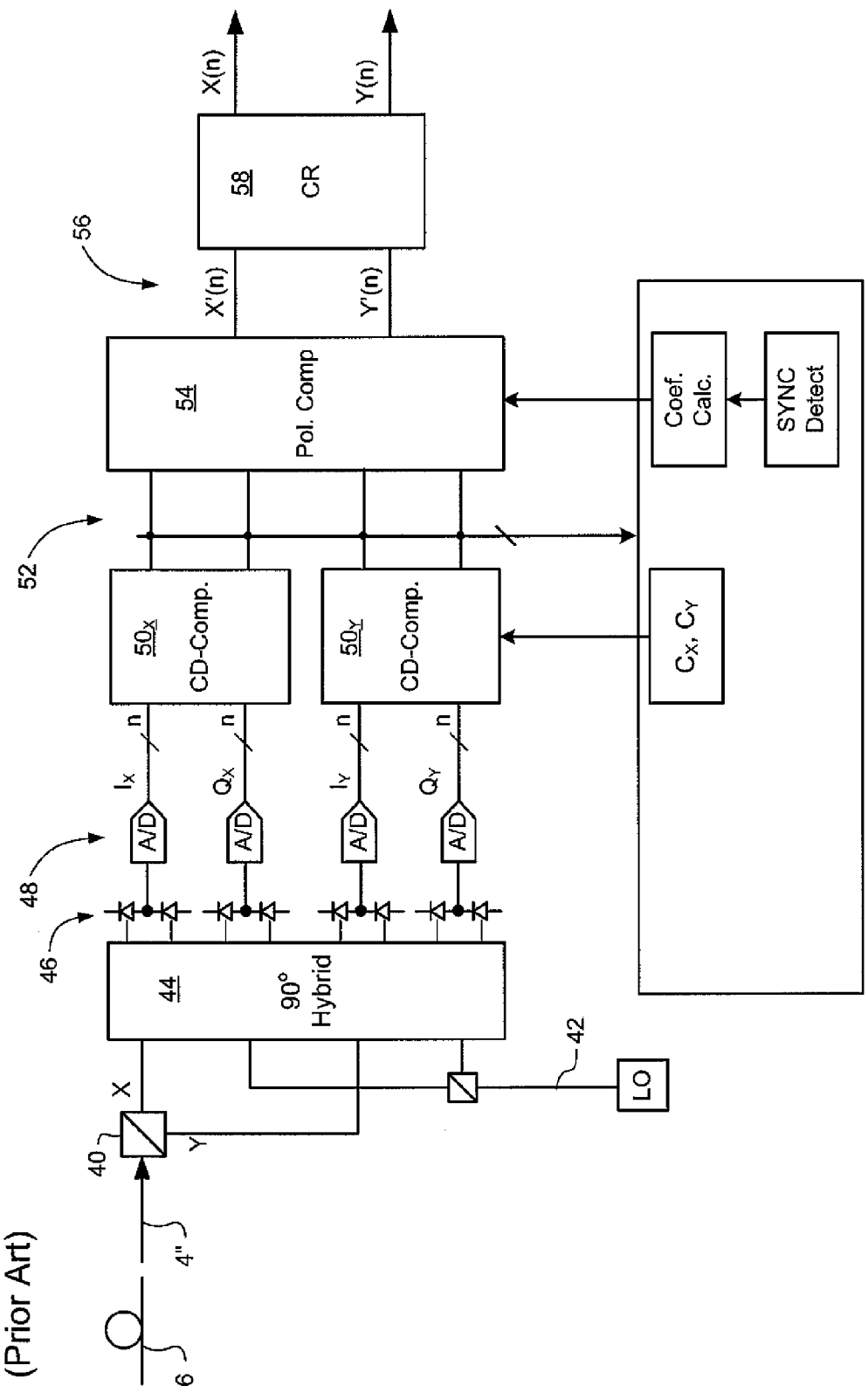
FIG. 3 is a block diagram schematically illustrating principal elements and operations of a coherent optical receiver known from Applicant's co-pending U.S. patent applications Ser. Nos. 11/294,613; 11/315,342; 11/315,345; 11/366,392; and 11/423,822.
Figure 4A:
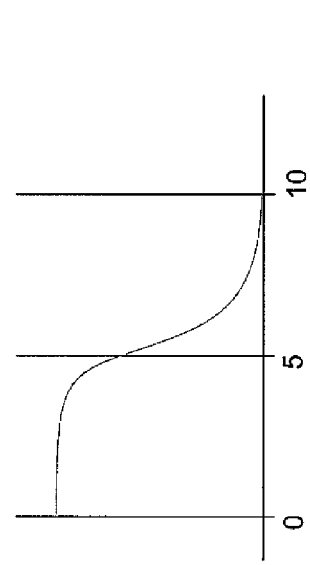
FIGS. 4a-4d illustrate aliasing in conventional digital signal processing systems.
Figure 4C:
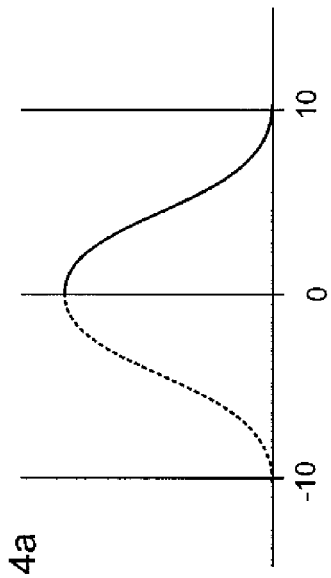
Figure 4B:
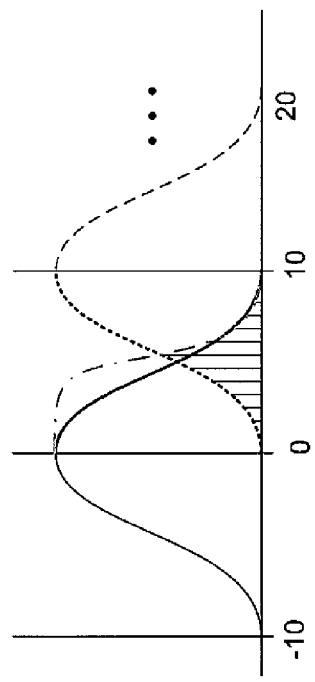
Figure 4D:
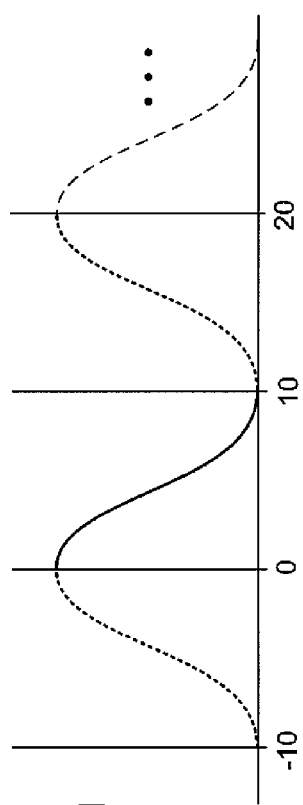
Figure 5A:
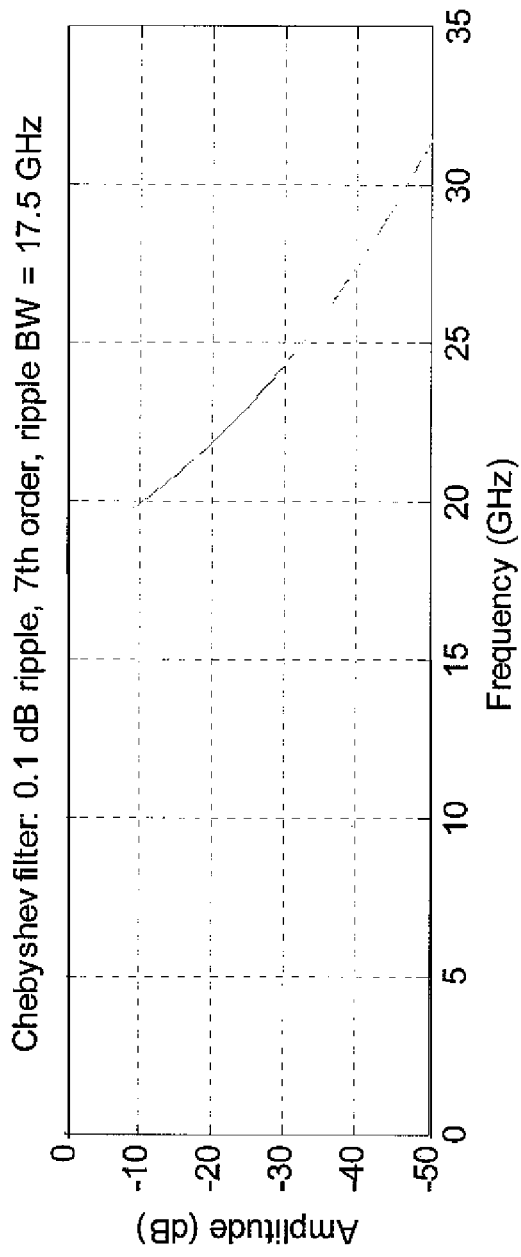
FIGS. 5a and 5b respectively illustrate amplitude and group delay characteristics of a conventional Chebychev filter having a bandwidth of 17.5 GHz and a steep roll-off.
Figure 5B:
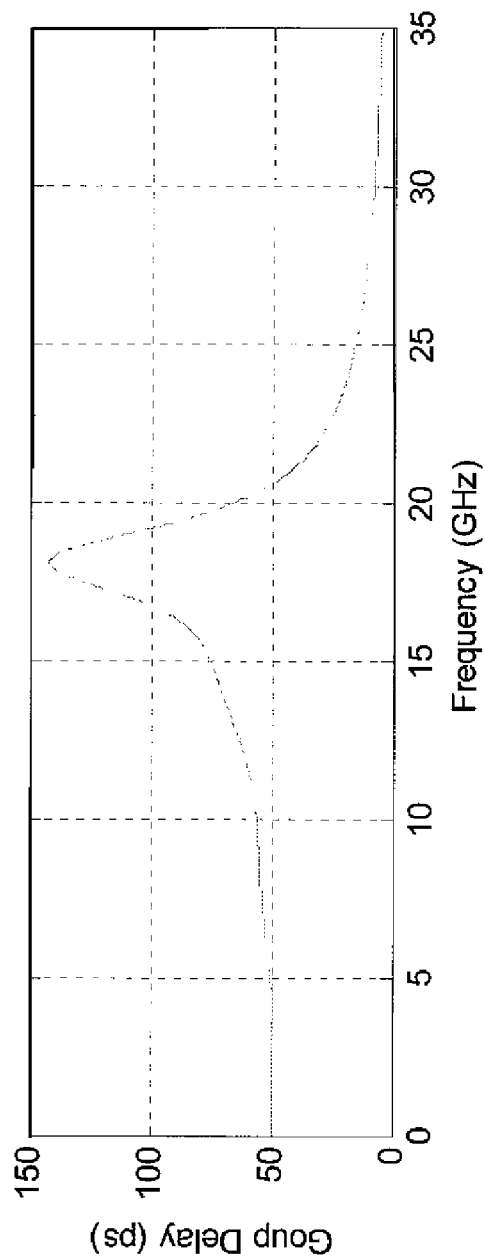

As may be seen in FIG. 10, the coherent optical receiver generally comprises a Polarization Beam Splitter 40; 90° optical hybrid 44; photodetectors 46; and A/D converters 48. All of these elements may operate as described above with reference to FIG. 3, except that in this case, the A/D converters 48 are driven to sample the photodetector current at a sample rate $T_s$ of $T > T_s > T/2$. For example, in some embodiments, the sample rate Ts may correspond to $T_s = 7T/8$. In an optical communications system in which the line rate is 1/T=35 GBaud, 7T/8-sampling corresponds with a sample rate of 40 GHz. Analog anti-aliasing filters 86 inserted between the photodetectors 46 and A/D converters 48 implement a conventional low-pass filter characteristic (such as, for example, and Butterworth-8 filter) having a sharp roll-off at about 1/2T=17.5 GHz to suppress aliasing terms beyond about 20 GHz, as described above with reference to FIG. 6. The phase distortions produced by these anti-aliasing filters 86 can be digitally compensated as described below. The raw digital sample streams $I_X$, $Q_X$, and $I_Y$, $Q_Y$ generated by the A/D converters 48 are supplied to a signal equalizer 88. If desired, timing control methods described in Applicant's co-pending U.S. patent application Ser. No. 11/550,042 filed Oct. 17, 2006, including the use of elastic stores (not shown in FIG. 10) between the A/D converters 48 and the equalizer 88 may be used to ensure at least coarse phase alignment between samples at the equalizer input.

Figure 11:
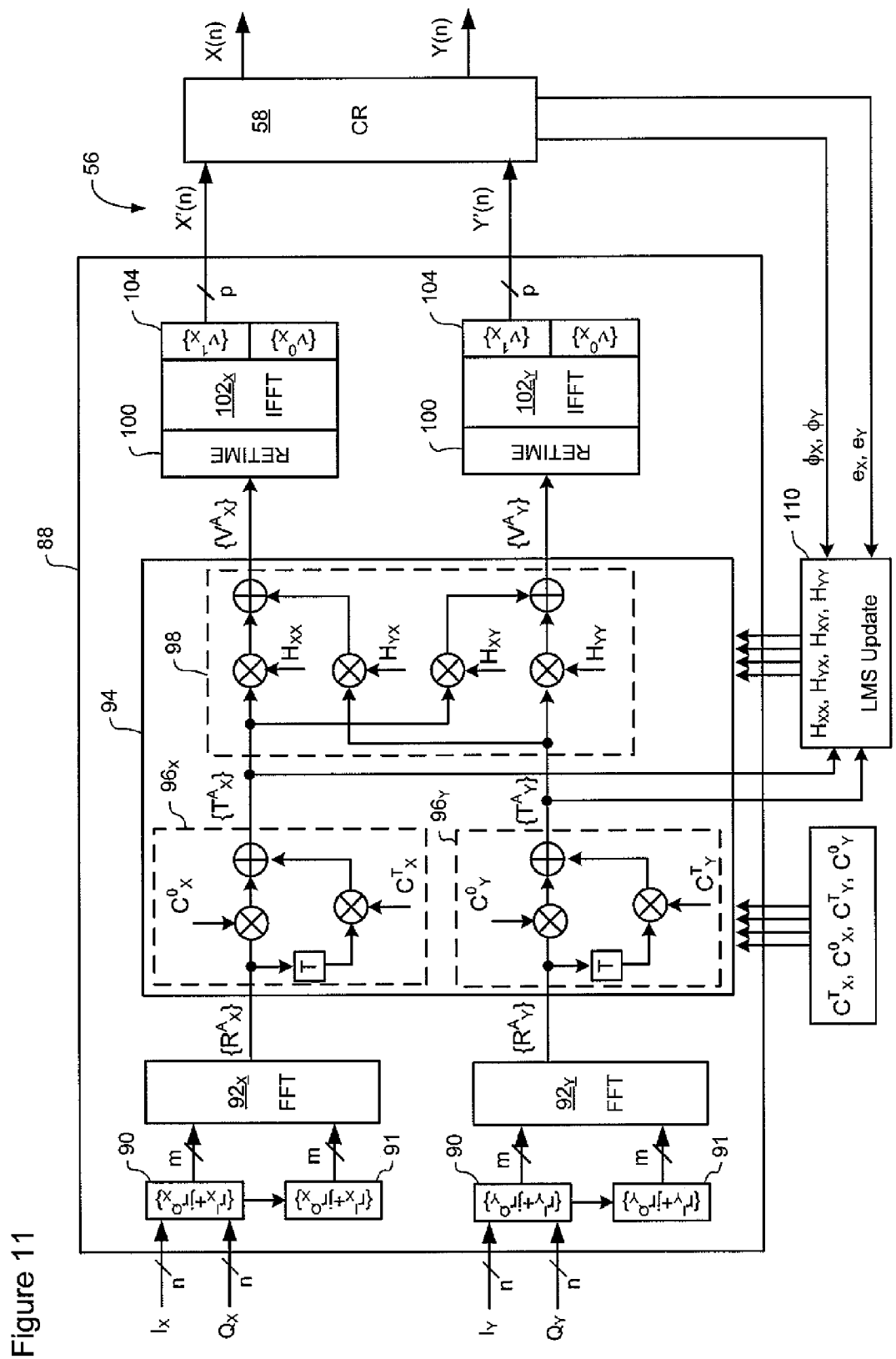
FIG. 11 is a block diagram schematically illustrating principal elements and operations of the equalizer of FIG. 10.

In general, the equalizer 88 operates to compensate chromatic dispersion and polarization rotation impairments, as well as the phase distortions produced by the analog filters 86. The compensated signals 56 output from the equalizer 88 represent multi-bit estimates X'(n) and Y'(n) of the symbols encoded on each transmitted polarization 34 of the received optical signal 4. The T-spaced (that is, at the timing of transmitted symbols) symbol estimates 56 X'(n), Y'(n), are supplied to a carrier recovery (CR) block 58 for LO frequency control, symbol detection and data recovery, such as described in Applicant's co-pending U.S. patent application Ser. No. 11/366,392 filed Mar. 2, 2006. FIG. 11 is a block diagram illustrating principle elements of a representative equalizer 88 useable in the receiver of FIG. 10.

In the embodiment of FIG. 11, the raw digital sample streams $I_X$, $Q_X$, and $I_Y$, $Q_Y$ generated by the A/D converters 48 are deserialized (at 90) to form m-word input vectors {r'x+jr^Qx} and {r'y+jr^Qy} which span one half the width of the FFT. During each clock cycle, the m-word vectors {r'x+jr^Qx} and {r'y+jr^Qy} are latched into the respective X- and Y-polarization FFT blocks 92, along with the corresponding "old" vectors (at 91) from the previous clock cycle. Each FFT block 92 is a conventional complex FFT block having a width selected to enable compensation of the maximum anticipated chromatic dispersion of the received optical signal. In some embodiments, each FFT block 92 may have a width of 1024 taps, in which case m=512. The arrays {R^A X} and {R^A Y} output by the FFT blocks 92 are then supplied to a Frequency Domain Processor (FDP) 94.

In the embodiment of FIG. 11, the FDP 94 comprises a respective transpose-and-add functional block 96 for each polarization, and a cross-compensation block 98. The transpose-and-add block 96 may operate in generally the same manner as described in Applicant's co-pending U.S. patent application Ser. No. 11/550,042 filed Oct. 17, 2006. Thus, the X-polarization transpose-and-add block 96x operates to add the FFT output array {R^A X} to a transposed (conjugate) version of itself {$\bar{R}_X^A$}, with respective different compensation vectors {C^o_x} and {C^T_x} to yield intermediate array {T^A_x}. Compensation vectors {C^o_x} and {C^T_x} can be computed using a transform of a 1^st order dispersive function to at least partially compensate chromatic dispersion of the optical link; and/or using empirical knowledge of propagation delays encountered in each signal path between the optical fiber 6 and the equalizer input to compensate residual sample phase errors in the raw digital signals generated by the A/D converters 48. In either case, the phase distortions introduced by the analog filters 86 can also be characterised as a function of frequency, using well known techniques. This information can then be used to modify the compensation vectors {C^o_x} and {C^T_x} so as to compensate phase distortions introduced by the analog filters 86. Of course, the Y-polarization transpose-and-add block 96_Y will operate in an exactly analogous manner.

The cross-compensation block 98 applies X-polarization vectors $H_{XX}$, $H_{XY}$ to the X-polarization intermediate array {T^A X}, and Y-polarization vectors $H_{YY}$, $H_{YX}$ to the Y-polarization intermediate array {T^A_Y}. The multiplication results are then added together to generate modified vectors {V^A_x} and {V^A_Y}, as may be seen in FIG. 11. The X- and Y-polarization vectors $H_{XX}$, $H_{XY}$, $H_{YY}$ and $H_{YX}$ are preferably computed using a transform of the total distortion at the output of the equalizer 88, as will be described in greater detail below. At a minimum, the X- and Y-polarization vectors $H_{XX}$, $H_{XY}$, $H_{YY}$ and $H_{YX}$ impose a phase rotation which compensates polarization impairments of the optical signal, and so de-convolve the transmitted symbols from the raw digital sample streams $I_X$, $Q_X$, and $I_Y$, $Q_Y$ generated by the A/D converters 48. Those of ordinary skill in the art will recognise that the illustrated cross-compensation block 98 implements an inverse-Jones matrix transfer function, which compensates the polarization effects. In this formulation, the vectors $H_{XX}$, $H_{XY}$, $H_{YY}$ and $H_{YX}$ are provided as the coefficients of the inverse-Jones matrix. The width of the inverse-Jones matrix is equal to that of the intermediate arrays {T^A_x} and {T^A_Y}, and so is based on the expected maximum dispersion of the received optical signal to be compensated by the equalizer 88.

The modified arrays {V^A_x} and {V^A_Y} output by the FDP 94 are then supplied to respective retiming blocks 100, which operate to re-time the modified arrays {V^A_x} and {V^A_Y} from the 7T/8 sample timing of the A/D converters 48 to the desired T-spaced timing of the multi-bit symbol estimates 56.

By way of example only, consider an embodiment in which a 35 GBaud optical signal is sampled at a sample rate of $1/T_s$=40 GHz. The A/D converters 48, FFT blocks 92, and FDP 88 will all operate at the sample rate of $1/T_s$=40 GHz. In this case, each of the arrays {R^A_x} and {R^A_Y} output by the FFT blocks 92, and thus each of the modified arrays {V^A_x} and {V^A_Y} output by the FDP 94 span a frequency range of 0-40 GHz, with upper side band (USB) spectrum at 0-20 GHz and lower side band (LSB) at 20-40 GHz, respectively. In principle, retiming of the modified arrays $\{V^A_X\}$ and $\{V^A_Y\}$ can be accomplished by extracting the center portion of each array, and then supplying the remaining portions to the IFFT blocks 102.

Figure 12:
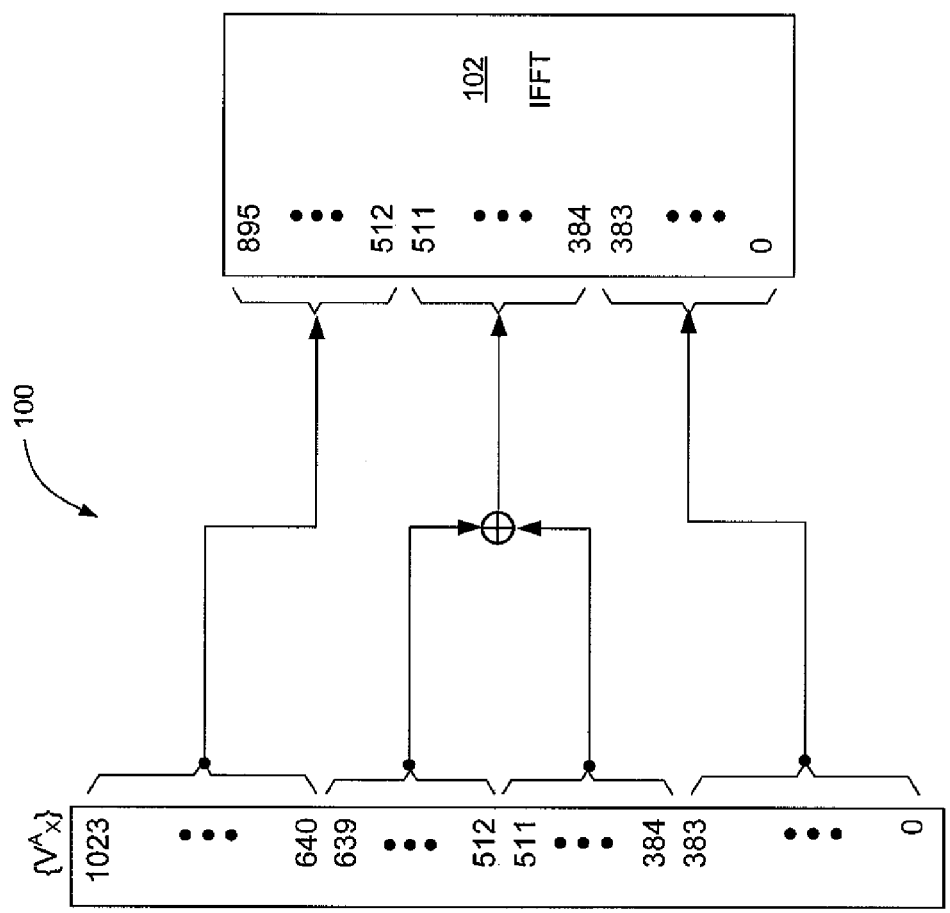
FIG. 12 is a block diagram schematically illustrating principal elements and operations of the retiming block of FIG. 11.

In an embodiment in which each FFT block 92 has a width of 1024 taps (that is taps n=0 . . . 1023), with USB at n=0-511 and LSB at n=512-1023. Retiming the modified arrays $\{V^A_X\}$ and $\{V^A_Y\}$ can be accomplished by recognising that, within each array, the combined spectrum is nominally symmetrical about the center of the array. Consequently, the upper and lower halves of the array can be overlapped by a selected number of taps in the center portion of the array, and the thus "overlapped taps" added together. The number of overlapped taps is selected so that, after the addition operation, the total number of remaining taps corresponds with the desired width of the retimed array. In the above example, the 1024 taps of the FFT output spans a frequency range of 0-40 GHz, and it is desired to reduce the frequency range to 0-35 GHz. This corresponds with a reduction of 128 taps. Thus, the upper and lower halves of each modified array $\{V^A_X\}$ and $\{V^A_Y\}$ are overlapped by 128 taps and the overlapped taps added together. This results in the 128 taps lying above the center of the array (taps n=512 . . . 639) being added to the 128 taps lying below the center of the array (taps n=384 . . . 511), and the summation result supplied to taps 384-511 of the retimed array, as shown in FIG. 12. The taps lying above and below this center region (at taps 0-383 and 640-1023, respectively) are then supplied to corresponding upper and lower portions of the retimed array, again as shown in FIG. 12. This operation effectively removes 128 taps from the center of each of the modified arrays $\{V^A_X\}$ and $\{V^A_Y\}$ to yield retimed arrays $\{V^A_X\}'$ and $\{V^A_Y\}'$, in the form of complex multi-bit vectors having a width of 896 taps, and spanning a frequency range of 0-35 GHz.

The retimed arrays $\{V^A_X\}'$ and $\{V^A_Y\}'$ are then supplied to the IFFT blocks 102, which operate at the T-spaced symbol rate of 35 GHz to generate time domain data 104, in the form of a complex valued vector having a width equal to the IFFT 102, which, in the illustrated embodiment is N=896 taps. The IFFT output data 104 is divided into two blocks $\{v^0_X\}$, and $\{v^1_X\}$, of which $\{v^1_X\}$ is selected as the equalizer output 56 in the form of a complex valued vector $\{v^I_X + jv^Q_X\}$ representing p=448 T-spaced complex valued estimates X'(n) and Y'(n) of the transmitted symbols. The other IFFT output block, $\{v^0_X\}$, is discarded.

Preferably, the X- and Y-polarization vectors $H_{XX}$, $H_{XY}$, $H_{YY}$ and $H_{YX}$ are computed at sufficient speed to enable tracking, and thus compensation, of high-speed polarization rotation transients. This may be accomplished using the Least Mean Squares (LMS) update loop 110 illustrated in FIG. 11, and described in greater detail below with reference to FIGS. 12 and 13.

Figure 13A:
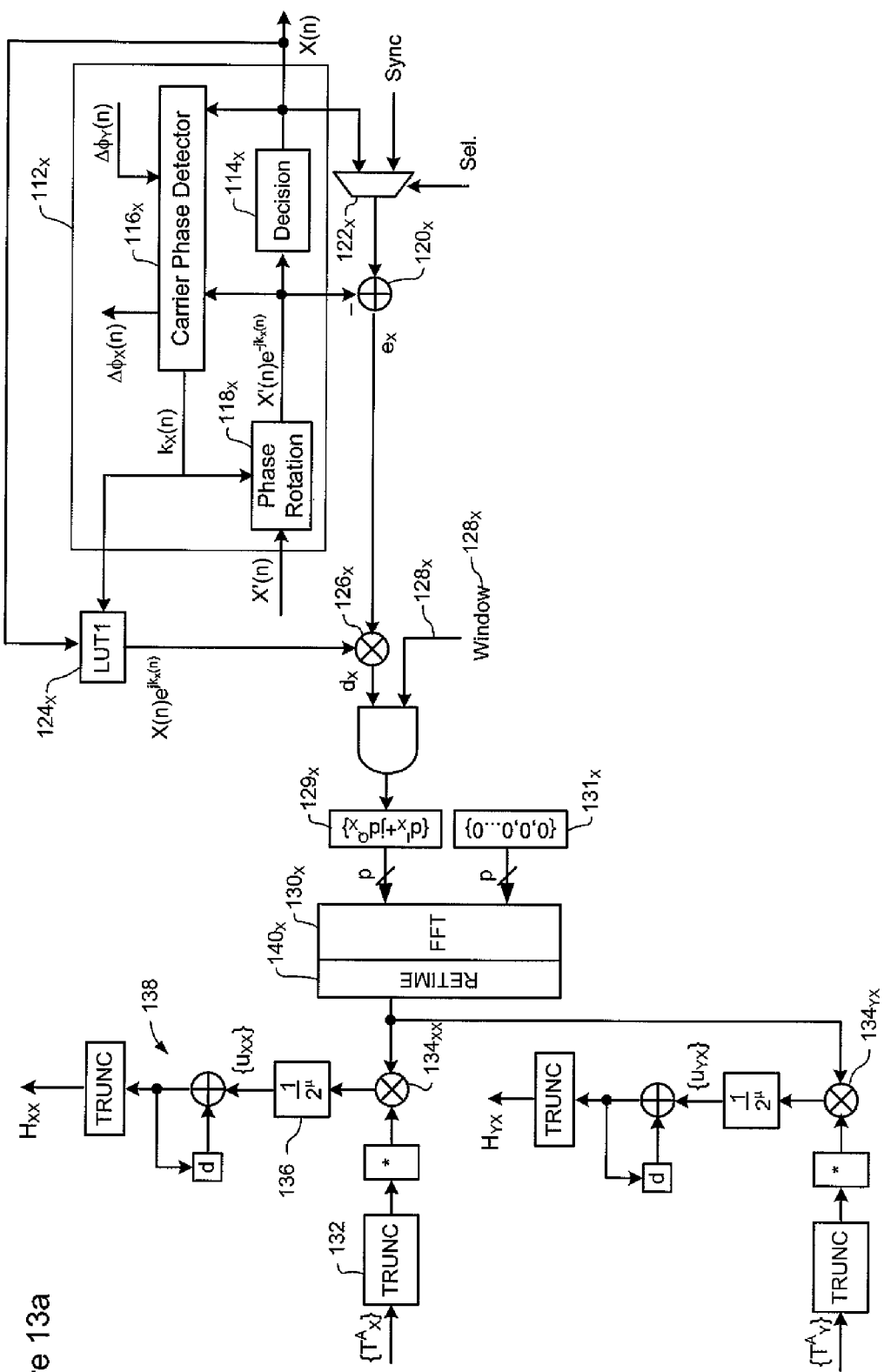
FIGS. 13a and 13b illustrate representative LMS loops for computing compensation vectors for the equalizer of FIG. 11.
Figure 13B:
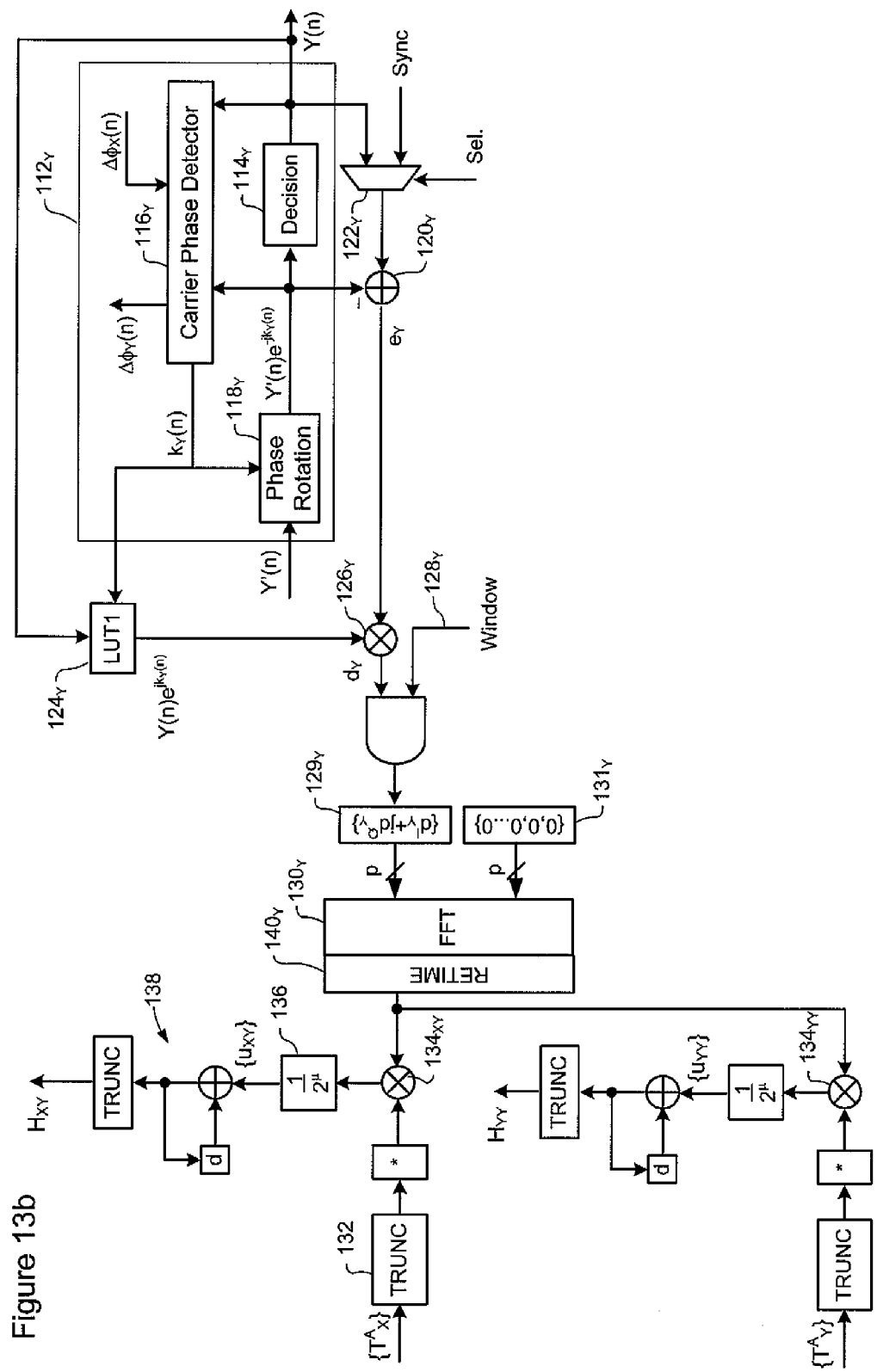

FIG. 13a shows an LMS update loop, according to one embodiment of the invention, for calculating polarization vectors $H_{XX}$ and $H_{YX}$. A directly analogous LMS loop for calculating the polarization vectors $H_{XY}$ and $H_{YY}$ is shown in FIG. 13b. In the embodiment of FIGS. 13a and 13b, the carrier recovery block 58 (FIG. 11) operates as described in Applicant's co-pending U.S. patent application Ser. No. 11/366,392 filed, Mar. 2, 2006. Thus, the carrier recovery block 58 is divided into two parallel processing paths 112 (only the X-polarization path 112x is shown in FIG. 13a, and the Y-polarization path 112y is shown in FIG. 13b), each of which includes a decision circuit 114 and a carrier recovery loop comprising a carrier phase detector 116 and a phase rotator 118. In general, the phase rotators 118 use a carrier phase estimate generated by the respective carrier phase detector 116 to compute and apply a phase rotation (correction) k(n) to the symbol estimates X'(n) and Y'(n) received from the signal equalizer 88. The decision circuits 114 use the phase-rotated symbol estimates $X'(n)e^{-jK_X(n)}$ and $Y'(n)e^{-jK_Y(n)}$ to generate recovered symbol values X(n) and Y(n), and the phase detectors 116 operate to detect respective phase errors $\Delta\phi$ between the rotated symbol estimates $X'(n)e^{-jK_X(n)}$ and $Y'(n)e^{-jK_Y(n)}$ and the corresponding recovered symbol values X(n) and Y(n).

Referring to FIG. 13a, the $H_{XX}$ LMS update loop receives the phase error correction $k_X(n)$ of each successive symbol estimate X'(n), which is calculated by the phase detector 116 as described in Applicant's co-pending U.S. patent application Ser. No. 11/366,392. In addition, the rotated symbol estimate $X'(n)e^{-jK_X(n)}$ and its corresponding decision value X(n) are also received from the carrier recovery block 58, and compared (at 120) to obtain a complex symbol error value $e_X$, which is indicative of residual distortion of the symbol estimate X'(n). In some embodiments it is desirable to format the optical signal into data bursts comprising a plurality of data symbols separated by a SYNC burst having a known symbol sequence. In such cases, a selector 122 can be used to supply a selected one of the decision values X(n) and the known SYNC symbols to the comparator 120. With this arrangement, the selector 122 can be controlled to supply the known SYNC symbol sequence to the comparator 120 during each SYNC burst, so that the error value $e_X$ is computed using the known SYNC symbols rather than the (possibly erroneous) decision values X(n).

In order to minimize calculation complexity through the LMS update loop, the resolution of the complex symbol error $e_X$ is preferably lower than that of the symbol estimate X'(n). For example, in an embodiment in which the symbol estimate X'(n) has a resolution of 7 bits for each of the real and imaginary parts (denoted herein as "7+7 bits"), the complex symbol error $e_X$ may have a resolution of, for example, 3+3 bits. It will be noted, however, that the present invention is not limited to these resolution values.

The phase rotation $k_X(n)$ is combined with the corresponding recovered symbol value X(n), for example using a Look-up-Table (LUT) 124, to generate a corresponding complex value $X(n)e^{jk_X(n)}$ with a desired resolution (e.g. 3+3 bits) matching that of the symbol error $e_X$. This allows the phase error $X(n)e^{jk_X(n)}$ and symbol error $e_X$ to be multiplied together (at 126) to obtain a complex value $d_X$ indicative of the total residual distortion of the symbol estimate X'(n).

Applicant's U.S. patent application Ser. No. 11/423,822 filed Jun. 13, 2006 describes methods and systems for signal acquisition in a coherent optical receiver. As described in U.S. patent application Ser. No. 11/423,822, during a start-up operation of the receiver (or during recovery from a "loss-of frame" condition), LO frequency control, clock recovery, dispersion compensation and polarization compensation loops implement various methods to acquire signal, and stabilize to steady-state operation. During this "acquisitions period", the rotated symbol estimates $X'(n)e^{-jK(n)}$ and their corresponding decision values X(n) are probably erroneous. Accordingly, in the embodiment illustrated in FIGS. 13a and 13b, a window select line 128 may be used to zero out those values of the distortion vector $d_X$ which are computed from non-synch symbols. Values of the distortion ($d_X$) which are computed from the known SYNC symbols are likely to be valid, even during signal acquisition, and thus are left unchanged.

The symbol distortion values $d_X$ are deserialized (at 129) to generate a p-word (following the above example, p=448) distortion vector $\{d^I_X + jd^Q_X\}$, which is padded with a p-word zero vector (i.e. a vector comprising p zeros) 131 and is input to a Fast Fourier Transform (FFT) block 130, which calculates the frequency domain spectrum of the symbol distortion vector $\{d^I_X+jd^Q_X\}$. As will be appreciated, values of the distortion vector $\{d^I_X+jd^Q_X\}$ are generated at the symbol timing. In the case of 7T/8 sampling, this is less than the sample rate of the raw digital sample streams $I_X$, $Q_X$, and $I_Y$, $Q_Y$ generated by the A/D converters 48, and it is therefore necessary to adjust the timing of the error values $d_X$ to match the sample timing. At the same time, the width of the frequency domain spectrum of the (re-timed) symbol distortion vector $d_X$ should preferably correspond with that of the intermediate array $\{T^A_X\}$. With this arrangement, each value of the intermediate array $\{T^A_X\}$ can be truncated (at 132) to match the resolution of the FFT block output (e.g. 3+3 bits), and then a conjugate of the truncated array multiplied with the FFT output array (at 134), to compute a low-resolution correlation between $\{T^A_X\}$ and the retimed FFT output. This correlation vector can then be scaled (at 136) to obtain an update vector $\{u_{xx}\}$, which is accumulated (at 138) to obtain a vector representation of the total distortion of the intermediate array $\{T^A_X\}$. Truncating the total distortion vector, for example by taking the 7+7 most significant bits, yields the cross-compensation vector $H_{XX}$.

As noted above, directly analogous methods can be used to compute each of the other cross-compensation vectors $H_{XY}$, $H_{YY}$ and $H_{YX}$, which are therefore not described herein in detail.

Figure 14:
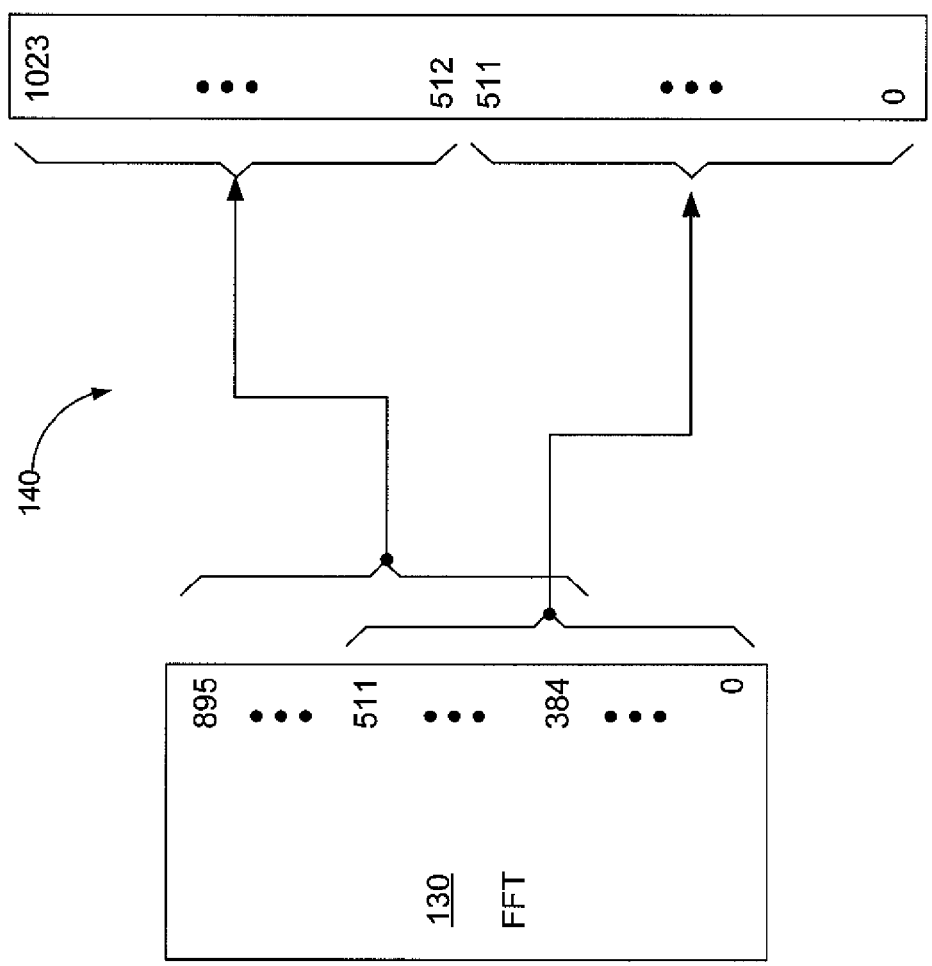
FIG. 14 is a block diagram schematically illustrating principal elements and operations of the retiming block of FIGS. 13a and 13b.

As may be seen in FIGS. 13a and 14, re-timing of the symbol distortion vector $\{d^I_X+jd^Q_X\}$ can be accomplished by inserting a re-timing block 140 at the output of the FFT 130. In this case, the width of the FFT 130 is selected to match the width of the IFFT blocks 102 of the equalizer 88 (e.g. N=896 taps, following the above example). With this arrangement, the retiming block 140 can be constructed as shown in FIG. 14. Thus, the FFT taps (0-511) are supplied to taps 0-511 of the re-timed spectrum, while FFT taps 384-895 are supplied to taps 512-1023 of the re-timed spectrum. This results in a retimed spectrum of 1024 taps in width, which corresponds with the intermediate arrays $\{T^A_X\}$, as desired.

In the embodiments described above, the reconstruction (anti-aliasing) filters are provided by analog electrical filters. However, other filtering methods, including optical band pass filtering and digital filtering techniques can be used either in conjunction with or instead of the analog electrical low pass filters. Analog filtering can be done in any or all of the transmitter, optical link, and receiver.

For simplicity of description, a single carrier is used in the described methods. Multiple optical or electrical carriers that are coherent, partially coherent or incoherent can be used. Various other signal formats and digital compensation methods can be used, such as Optical Orthogonal Frequency Division Multiplexing, or subcarrier multiplexing.

In the foregoing embodiments, 7T/8 and 8T/9 sampling is described. These ratios are convenient for the retiming techniques described, but other ratios may equally be used. Furthermore, while simple fractional ratios (i.e. wherein both the numerator and the denominator are integers) are often convenient, this is not essential. Non-integer ratios may be used, if desired.

In the foregoing embodiments, values of 1<N<2 (e.g. N=8/7 and N=9/8) are used. Values of N in this range are useful for the retiming techniques described. However, with suitable programming, values of N equal to or less than 1 may also be used.

The embodiments of the invention described above are intended to be illustrative only. The scope of the invention is therefore intended to be limited solely by the scope of the appended claims.

We claim:

1. A method of suppressing effects of aliasing in a system for digitally processing a high speed signal having a symbol rate of 1/T, the method comprising:
   filtering the high speed signal using a low-pass filter characteristic having a cut-off frequency corresponding to approximately ½T, and a roll-off greater than 20 dB per decade;
   sampling the high speed signal at a fractional multiple (N) of the symbol rate, wherein N<2, to generate a corresponding sample stream; and
   digitally processing the sample stream to compensate phase distortions due to the filtering.

2. The method as claimed in claim 1, wherein N<3/2.

3. The method as claimed in claim 1, wherein N>1.

4. The method as claimed in claim 1, wherein the high speed signal is an input data stream x(t) to be transmitted through a link of an optical communications system, and wherein sampling the high speed signal comprises generating a stream of multi-bit samples of a desired complex optical E-field envelope of an optical signal for conveying the high speed signal through the link, based on the input data stream x(t).

5. The method as claimed in claim 4, wherein the fractional multiple N=n/d, and wherein generating the stream of multi-bit samples comprises, during each clock cycle of period dxT:
   converting the high speed signal into a set of n parallel input vectors, each input vector having a respective predetermined delay;
   for each input vector, computing a respective multi-bit sample value of the desired complex optical E-field envelope at a predetermined phase shift relative the input vector; and
   interleaving the computed multi-bit sample values.

6. The method as claimed in claim 5, wherein computing the respective multi-bit sample value of the desired complex optical E-field envelope comprises applying a compensation operator C[] to the input vector, the compensation operator C[] being computed to compensate at least chromatic dispersion of the link.

7. The method as claimed in claim 6, wherein digitally processing the sample stream to compensate phase distortions due to the filtering comprises:
   characterizing the phase distortions as a function of frequency; and
   computing the compensation operator C[] using the phase distortion characteristic so as to compensate the phase distortions.

8. The method as claimed in claim 5, wherein the predetermined delay of each input vector and the predetermined phase shift used for computation of the respective multi-bit sample value for each input vector, are cooperatively selected such that the n multi-bit sample values computed during each clock cycle represent successive instantaneous values of the desired complex optical E-field envelope that are evenly spaced in time.

9. The method as claimed in claim 8, wherein at least the step of computing, for each input vector, the respective multi-bit sample value is performed by a set of n parallel filter blocks, and wherein, for values of n=9 and d=8, the predetermined delay of each input vector and the predetermined phase shift used for computation of the respective multi-bit sample value for each input vector are:

| Filter Block | Delay | Phase Shift |
| --- | --- | --- |
| 0 | 0 | +4T/9 |
| 1 | T | +3T/9 |
| 2 | 2T | +2T/9 |
| 3 | 3T | +T/9 |
| 4 | 4T | 0 |
| 5 | 5T | −T/9 |
| 6 | 6T | −2T/9 |
| 7 | 7T | −3T/9 |
| 8 | 7T | +5T/9 |

10. The method as claimed in claim 4, wherein generating the stream of multi-bit samples comprises:
   computing a Fast Fourier Transform (FFT) of the input data stream x(t) to generate an array {R} representing a frequency domain spectrum of the input data stream x(t);
   processing the array {R} to generate a retimed array {R'} having a width corresponding to N times the width of the array {R}; and
   computing an Inverse Fast Fourier Transform (IFFT) of the modified array {M}.

11. The method as claimed in claim 10, wherein computing the Fast Fourier Transform (FFT) of the input data stream x(t) comprises steps of:
   encoding the input data stream x(t) using a selected encoding scheme to generate a corresponding multi-bit complex valued symbol stream; and
   computing a Fast Fourier Transform (FFT) of the multi-bit complex valued symbol stream.

12. The method as claimed in claim 11, wherein the encoding scheme is selected from the set consisting of: Phase Shift Keying (PSK); Quadrature Phase Shift Keying (QPSK); and Optical Orthogonal Frequency Domain Multiplexing (O-OFDM).

13. The method as claimed in claim 10, wherein processing the array {R} to generate a retimed array {R'} comprises increasing the width of the array {R} by a factor of N.

14. The method as claimed in claim 13, wherein increasing the width of the array {R} comprises:
   supplying a lowermost set of taps of the array {R} to a corresponding set of lowermost taps of the retimed array {R'}; and
   supplying an uppermost set of taps of the array {R} to a corresponding set of uppermost taps of the retimed array {R'};
   wherein the lowermost set of taps of the array {R} at least partially overlaps the uppermost set of taps of the array {R}, and wherein the set of lowermost taps of the retimed array {R'} is contiguous with the set of uppermost taps of the retimed array {R'}.

15. The method as claimed in claim 10, wherein digitally processing the sample stream to compensate phase distortions due to the filtering comprises:
   characterizing the phase distortions as a function of frequency; and
   computing the compensation vector using the phase distortion characteristic so as to compensate the phase distortions.

16. The method as claimed in claim 1, wherein the high speed signal is modulated on at least one transmitted polarization of an optical signal received through an optical link of an optical communications system, and wherein sampling the high speed signal comprises:
   generating respective in-phase and quadrature multi-bit raw digital sample streams for each received polarisation of the optical signal, a sample rate of the multi-bit raw digital sample streams being N times the symbol rate of the high speed signal;
   processing the multi-bit raw sample streams to compensate at least chromatic dispersion and polarization effects of the optical link; and
   retiming the processing result to the symbol rate of the high speed signal.

17. The method as claimed in claim 16, wherein processing the multi-bit raw sample streams and retiming the processed sample stream comprises:
   computing a Fast Fourier Transform (FET) of the at least two multi-bit raw digital sample streams to generate at least two arrays {R}, each array {R} representing a frequency domain spectrum of a respective received polarization of the received optical signal, and
   digitally processing the arrays {R} to generate at least one modified array {V}, each modified array {V} representing a frequency-domain spectrum of a corresponding transmitted polarization of the optical signal.

18. The method as claimed in claim 17, wherein retiming the processing result comprises changing a width of each modified array {V} by a factor of 1/N.

19. The method as claimed in claim 18, wherein changing a width of each modified array {V} comprises:
   defining contiguous upper and lower sets of taps of the modified array {V}, each set of taps encompassing half of the taps of the modified array {V};
   overlapping the upper and lower sets of taps by a predetermined number of taps in a center portion of the modified array {V};
   adding the overlapped taps together, and supplying the addition result to corresponding central taps of a retimed array {V}';
   supplying uppermost taps lying above the center region of the modified array {V} to corresponding uppermost taps of the retimed array {V}'; and
   supplying lowermost taps lying below the center region of the modified array {V} to corresponding lowermost taps of the retimed array {V}'.

* * * * *